(12) United States Patent
Tukker et al.

(10) Patent No.: US 7,170,832 B2
(45) Date of Patent: Jan. 30, 2007

(54) OPTICAL SCANNING DEVICE

(75) Inventors: Teunis Willem Tukker, Eindhoven (NL); Bernardus Hendrikus Wilhelmus Hendriks, Eindhoven (NL); Coen Theodorus Hubertus Fransiscus Liedenbaum, Eindhoven (NL); Stein Kuiper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 114 days.

(21) Appl. No.: 10/527,870

(22) PCT Filed: Sep. 12, 2003

(86) PCT No.: PCT/IB03/03935

§ 371 (c)(1),
(2), (4) Date: Mar. 16, 2005

(87) PCT Pub. No.: WO2004/027769

PCT Pub. Date: Apr. 1, 2004

(65) Prior Publication Data

US 2006/0087711 A1    Apr. 27, 2006

(30) Foreign Application Priority Data

Sep. 19, 2002  (EP) ................................ 02078939
Nov. 29, 2002  (EP) ................................ 02080016

(51) Int. Cl.
*G11B 7/00*    (2006.01)
(52) U.S. Cl. ................. 369/44.27; 369/44.23; 369/112.02; 369/112.16; 369/112.24; 369/116
(58) Field of Classification Search ............... None
See application file for complete search history.

(56) References Cited

U.S. PATENT DOCUMENTS

| 4,307,929 | A | | 12/1981 | Eveleth et al. |
| 4,363,113 | A | | 12/1982 | Taner et al. |
| 4,737,906 | A | | 4/1988 | Edwards |
| 4,770,507 | A | * | 9/1988 | Arimoto et al. ............ 359/669 |
| 5,398,223 | A | * | 3/1995 | Tsujioka et al. ......... 369/53.27 |
| 5,644,413 | A | * | 7/1997 | Komma et al. .......... 369/44.23 |

(Continued)

FOREIGN PATENT DOCUMENTS

JP    08102079 A    4/1996

(Continued)

*Primary Examiner*—Thang V. Tran
(74) *Attorney, Agent, or Firm*—Michael E. Belk

(57) ABSTRACT

A optical scanning device (1) for scanning an information layer (2) with a radiation beam (25) in a writing mode and a reading mode comprises a radiation source (7) for emitting the beam and an objective lens (10) for converging the beam so as to form a scanning spot (19) in the information layer. The device also includes a scanning spot power switch (20) for switching the size of the cross-section of the beam between a first size at the writing mode and a second, larger size at the reading mode so as to switch the rim intensity of the beam between a first intensity level (Irim,writing) at the writing mode and a second, higher intensity level (Irim, reading) at the reading mode, thereby switching the light power of the scanning spot between a first power level (Pwriting) at the writing mode and a second, lower power level (Preading) at the reading mode.

7 Claims, 15 Drawing Sheets

U.S. PATENT DOCUMENTS

Figure 1:
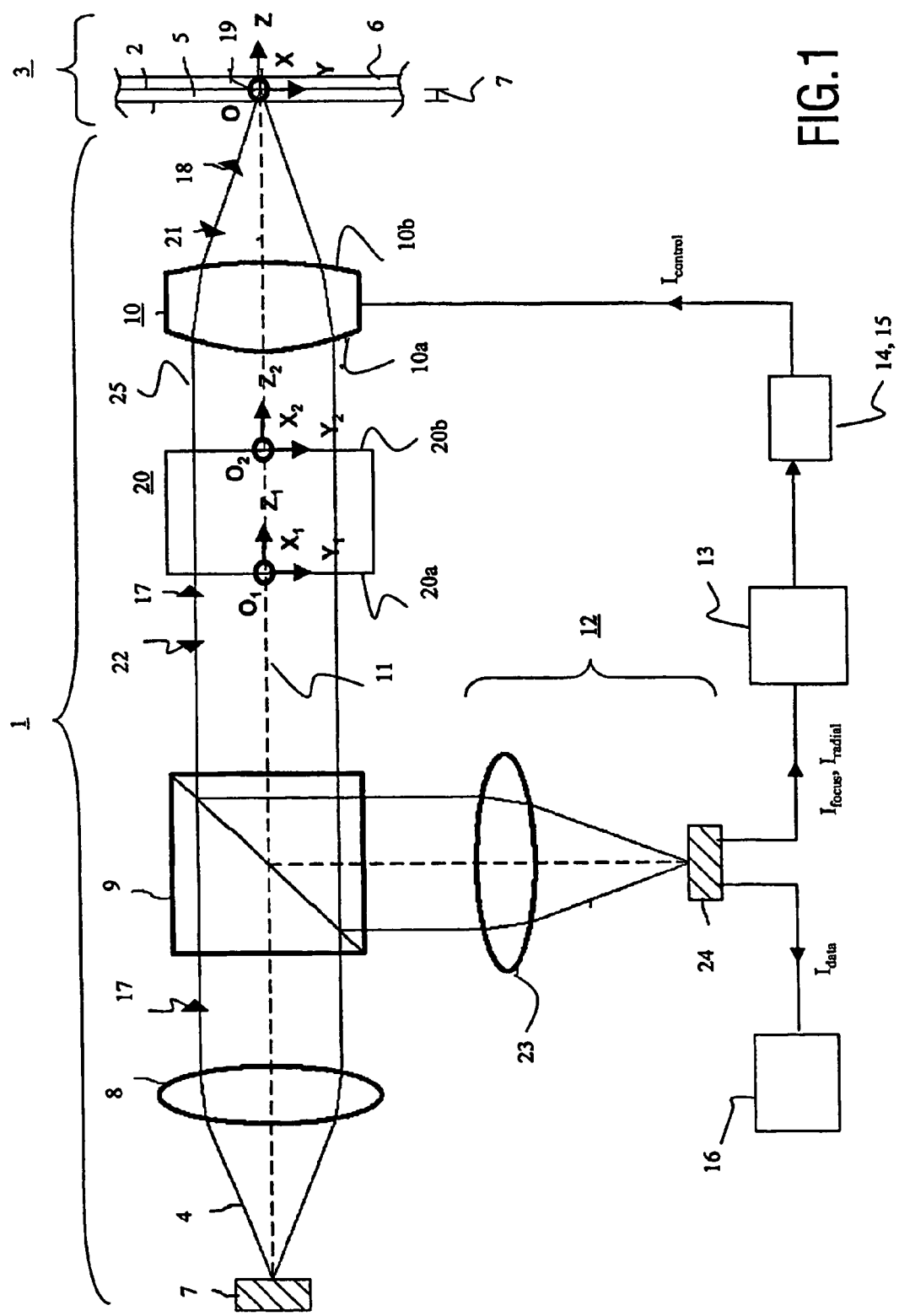

| | | | |
|---|---|---|---|
| 5,737,299 A * | 4/1998 | Yoo et al. | 369/112.17 |
| 6,166,854 A * | 12/2000 | Katsuma | 359/569 |
| 6,342,976 B1 * | 1/2002 | Nomura et al. | 359/569 |
| 6,791,934 B2 * | 9/2004 | Shimano et al. | 369/112.23 |
| 6,940,794 B2 * | 9/2005 | Hayashi | 369/47.5 |
| 2004/0257961 A1 * | 12/2004 | Nishi et al. | 369/112.02 |
| 2005/0117494 A1 * | 6/2005 | Nishi et al. | 369/116 |

FOREIGN PATENT DOCUMENTS

| | | |
|---|---|---|
| JP | 10269585 A | 10/1998 |
| JP | 11259895 A | 9/1999 |
| JP | 2001307365 A | 11/2001 |

* cited by examiner

OPTICAL SCANNING DEVICE

This application is a 371 of PCT/IB03/03935 filed Sep. 12, 2003

The present invention relates to an optical scanning device for scanning an information layer by means of a radiation beam in a writing mode and a reading mode, the device comprising:

a radiation source for emitting said radiation beam, an objective lens having an optical axis, for converging said radiation beam so as to form a scanning spot in the position of said information layer, and a scanning spot power switch arranged in the optical path of said radiation beam, for switching the light power of said scanning spot between a first light power at the writing mode and a second, lower light power at the reading mode.

The present invention also relates to a scanning spot power switch suitable for an optical scanning device for scanning an optical record carrier by means of a radiation beam at a writing mode and a reading mode.

"Scanning an information layer" refers to scanning by means of a radiation beam for reading information in the information layer ("reading mode") and/or writing information in the information layer ("writing mode"). By extension, a writing mode may consist in erasing information in the information layer ("erase mode").

An optical scanning device for scanning an information layer by means of a radiation beam in a writing mode and a reading mode is known from e.g. the U.S. Pat. No. 4,363,116. The known device has an optical axis and comprises: a radiation source for emitting the radiation beam, an objective lens system for converging the radiation beam so as to form a scanning spot in the information layer. The beam emitted by the radiation source has a substantially circular cross-section in a plane perpendicular to the optical axis. It is noted that the beam entering the objective lens system has a circular cross-section with the same size (diameter) in both the writing and reading modes.

The known scanning device further includes a scanning spot power switch arranged in the optical path of said radiation beam, for modifying the light power of said scanning spot so that the spot has a high light power at the writing mode and a low light power at the reading mode. Briefly, the spot light power must be high at the writing mode in order to produce an optically detectable change in the information layer, thereby writing information in the layer, and low at the reading mode in order not to alter the information written in the layer. The known spot power switch includes an electro-optical modulator for varying the polarization of the beam entering the objective lens system and an analyzer for converting the polarization variation into an intensity variation of the beam. Therefore, the switching of the spot light power is achieved by changing the maximum of the intensity of the radiation beam entering the objective lens system and the maximal intensity of the beam has a high level at the writing mode and a low level at the reading mode. It is noted that such an increase of the intensity maximum results in an unwarranted in the light power consumption of the scanning device.

While the known scanning device provides the radiation beam with the necessary high light power at the writing mode, the device does not provide at the reading mode the beam with the necessary high rim intensity.

In the present description a "rim ray" refers to a ray of a radiation beam entering the objective lens at the rim or border of the entrance pupil of that lens. Also, a "rim intensity" refers to a normalized value equals to the intensity of the radiation beam entering the objective lens at the rim or border of the entrance pupil of the objective lens, divided by the maximum of the intensity, i.e. the intensity at the center of the beam. In the following and by way of illustration only "high rim intensity" refers to a rim intensity equal to or higher than 70% and "low rim intensity" refers to a rim intensity lower than 70%. It is noted that such a rim ray and intensity is defined when the entrance pupil of the objective lens is fully filled, i.e. when the size of the radiation beam entering the objective lens is larger than the radius of the circular entrance pupil of the objective lens.

In respect of the known device it is noted that the rim intensity becomes a critical parameter at the reading mode. In that mode the device is to provide the beam so as to form the scanning spot with a size sufficiently small, i.e. a size that prevents or minimizes the tangential and radial cross-talk when reading the information layer. This may be achieved inter alia when the radiation beam entering the objective lens has a high rim intensity. By contrast, the rim intensity is of less importance at the writing mode but the total light power of the scanning spot becomes a critical parameter. This is due to the fact that during writing mainly the central part of the scanning spot is used for producing the highest temperature capable of producing a detectable change in the information layer. Consequently, in order to obtain such a temperature on the information layer, the light power of the radiation beam entering the entrance pupil of the objective lens is to be high. In general, as a result, the rim intensity of the radiation beam entering the objective lens is then rather low.

Accordingly, it is an object to provide an optical scanning device for scanning an optical record carrier by means of a radiation beam having a high light power level at the writing mode and a high rim intensity level at the reading mode.

This object is reached by an optical scanning device of the type described in the opening paragraph wherein, according to the invention, said scanning spot power switch is further arranged for switching the size of the cross-section of said radiation beam between a first size at the writing mode and a second, larger size at the reading mode so as to switch the rim intensity of said radiation beam between a first rim intensity level at the writing mode and a second, higher rim intensity level at the reading mode, thereby switching the light power of said scanning spot between said first light power level at the writing mode and said second light power level at the reading mode.

Thus, the scanning spot power according to the invention switch acts as a beam size (diameter) modifier so that the beam entering the objective lens has, at the writing mode, the high light power level and the low rim intensity level and, at the reading mode, the low light power level and the high rim intensity level, as explained in detail further.

It is noted that beam size modifiers are known in the field of optical storage but for other applications.

First, it is known, e.g. from the Japanese patent application JP 11-259895, to use a beam size modifier for focussing a radiation beam in the different information layers of a multilayer disc. Likewise, it is known, e.g., from the U.S. Pat. No. 4,307,929 a beam modifier including an liquid crystal lens that is electrically controllable for changing the refractive index and therefore the light power of the lens. As a result, the focal length of the liquid crystal lens is variable for focussing at different information depths, e.g. for scanning a CD-format disc and a DVD-format disc. It is noted that in both cases the known modifier changes the vergence of the beam entering the objective lens.

Second, it is known, e.g. from the Japanese patent application JP 10-269585, to use a beam size modifier for scanning optical record carriers having different information densities. "Information density" refers to the amount of stored information per unit area of the information layer. That known modifier is arranged for changing the numerical aperture of the beam entering the objective lens and the size of the scanning spot accordingly, depending on the information density of the disc to be scanned. Other techniques are known for scanning optical record carriers having different information densities, e.g. super resolution techniques as described e.g. in the Japanese patent application JP 2001-307365. It is noted that, in case of a known beam size modifier using a super resolution technique, the light power of the radiation beam entering the known modifier equals the light power of the radiation beam emerging from the known modifier.

Third, it is known, e.g. from the U.S. Pat. No. 4,734,906, to use a beam size modifier for reshaping an astigmatic, non-circular beam emitted by a diode laser into a circular beam free of astigmatism. However, that known device reshapes the beam in a manner that is optimized for both the writing and reading modes, without further considerations of the requirements imposed on the scanning spot at the writing and reading modes. In other words, that known device provides a compromise for reasonably writing and reading the information layer, but not an optimal solution for both writing and reading modes. Furthermore, that known beam size modifier includes an arrangement with two or three optical elements, which is difficult to move.

Thus, none of the known beam size modifiers are used for shaping the beam entering the objective lens so that that beam has, at the writing mode, the high light power level and the low rim intensity level and, at the reading mode, the low light power level and the high rim intensity level.

According to another aspect of the invention, the optical scanning device further includes a collimator lens arranged between said radiation source and said scanning spot power switch, and said scanning spot power switch forms a telescope-like arrangement having a switchable focal length so that the cross-section of said radiation beam has said first size at the writing mode and said second size at the reading mode.

It is noted that a beam modifier including a telescope-like arrangement is known e.g. from the already cited U.S. Pat. No. 4,734,906. However, with the aid of that known telescope-like arrangement, the beam is optimized for both the writing and reading modes, i.e. the cross-section of that beam has the same size for both modes. In other words, that known beam modifier is not switchable between the writing and reading modes.

It is another object of the present invention to provide a scanning spot power switch suitable for an optical scanning device for scanning an optical record carrier by means of a radiation beam having a high light power level at the writing mode and a high rim intensity level at the writing mode.

This object is reached by a scanning spot power switch suitable for an optical scanning device for scanning an optical record carrier by means of a radiation beam at a writing mode and a reading mode, the power switch being arranged for switching the light power of said radiation beam between a first light power level at the writing mode and a second, lower light power level at the reading mode wherein, according to the invention, the power switch is further arranged for switching the size of the cross-section of said radiation beam between a first size at the writing mode and a second, larger size at the reading mode in order to switch the rim intensity of said radiation beam between a first rim intensity level at the writing mode and a second, higher rim intensity level at the reading mode, thereby switching the light power of said scanning spot between said first light power level at said first mode and said second light power level at said second mode.

Figure 2A:
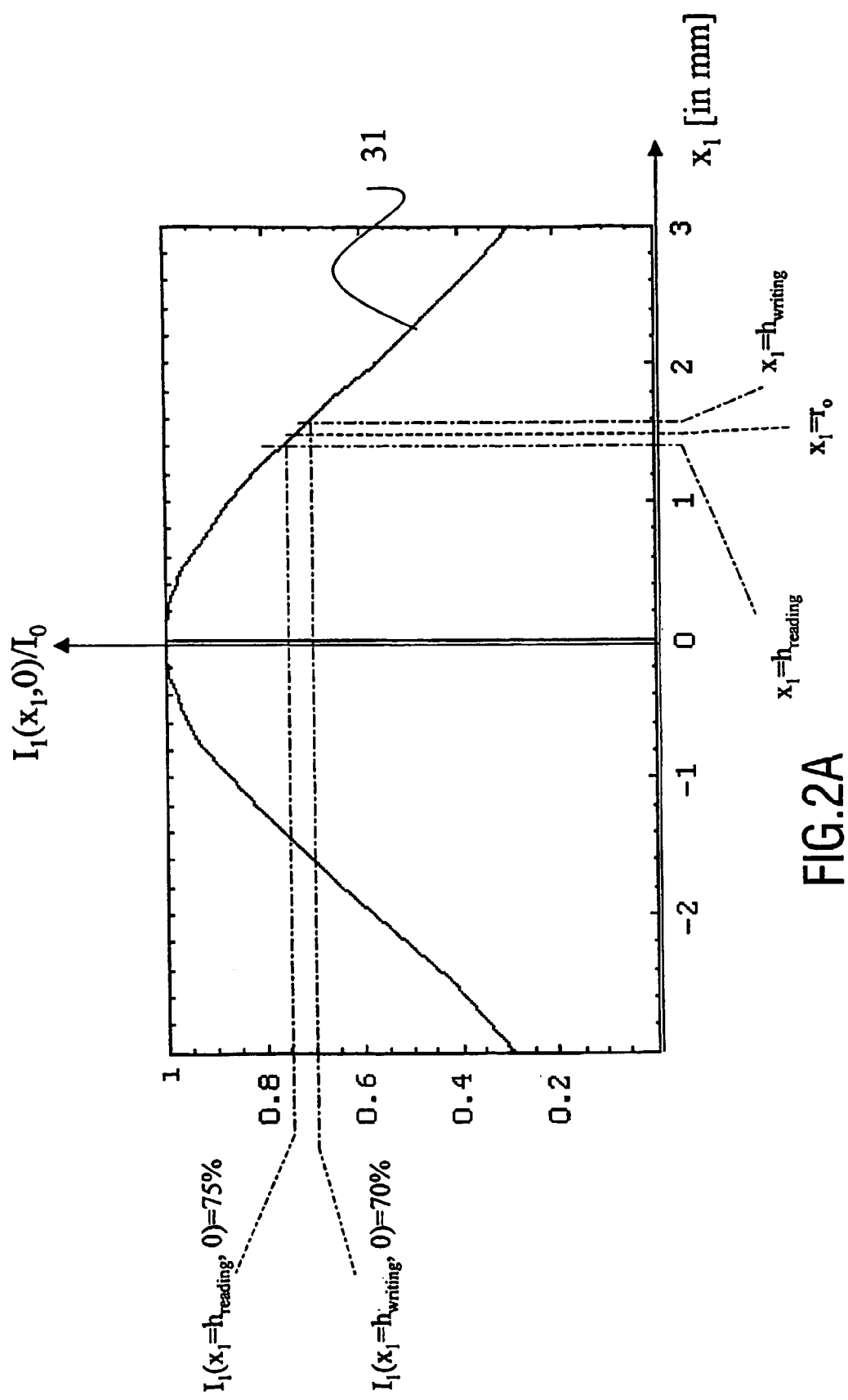
Figure 2B:
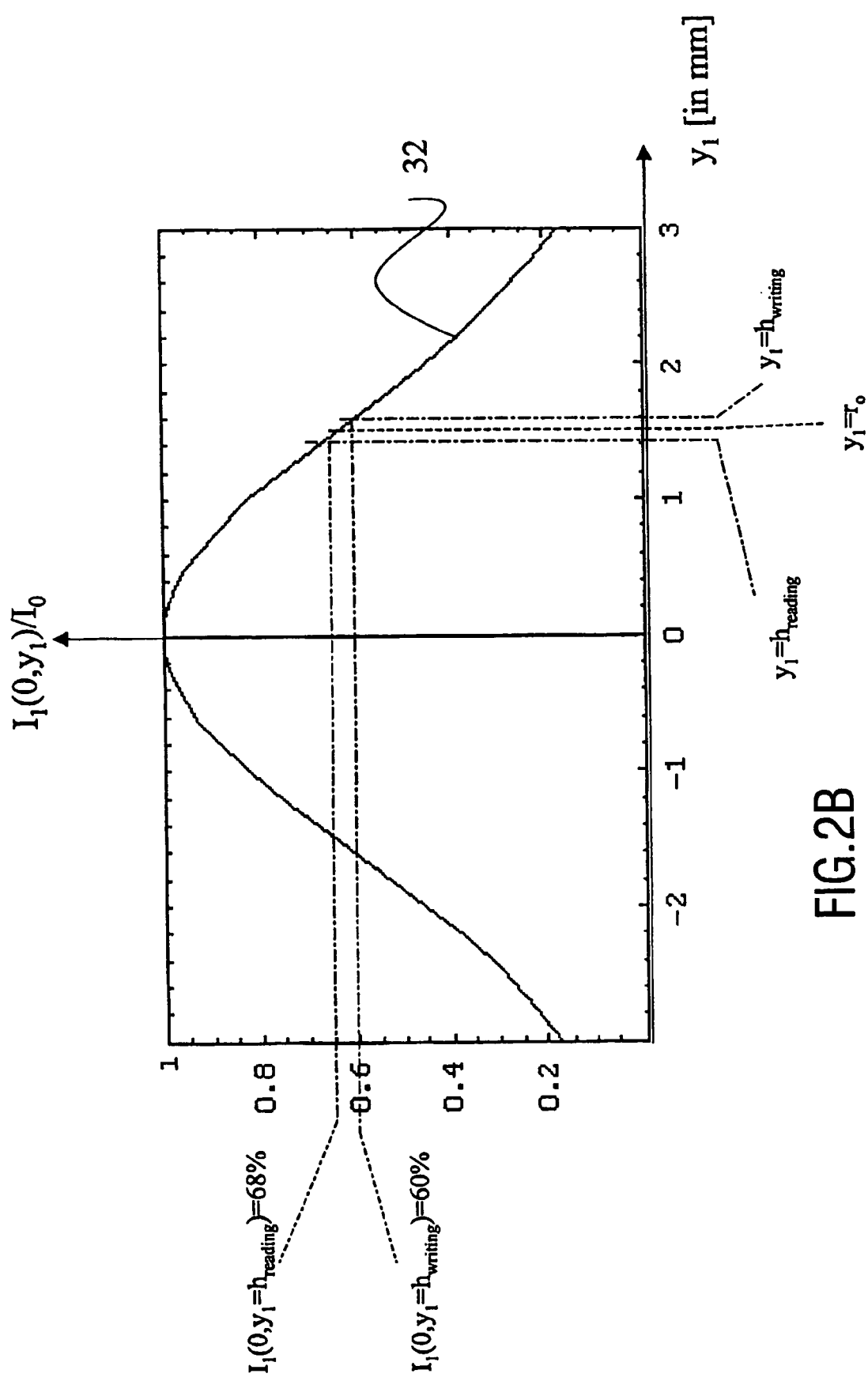
Figure 3A:
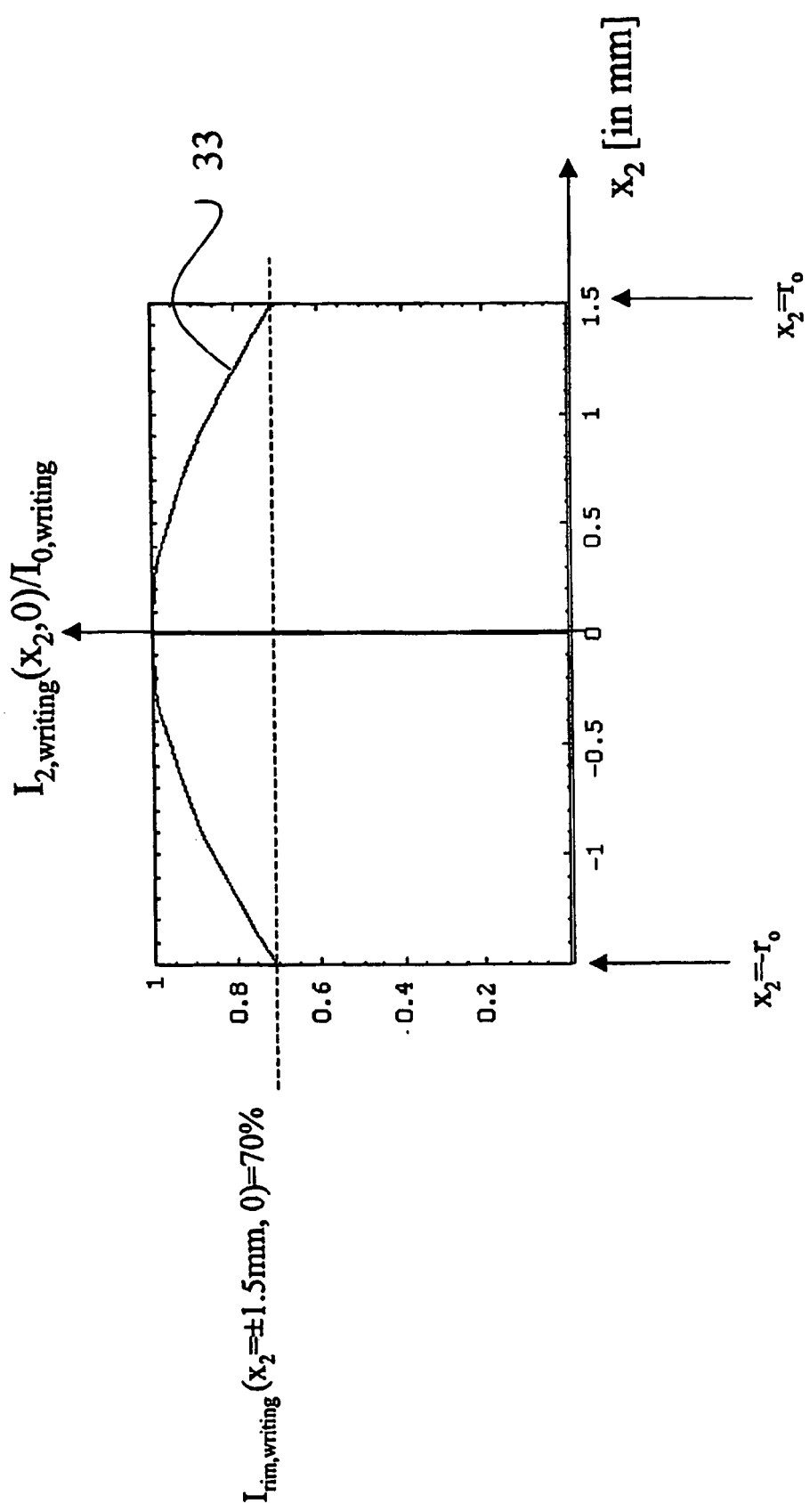
Figure 3B:
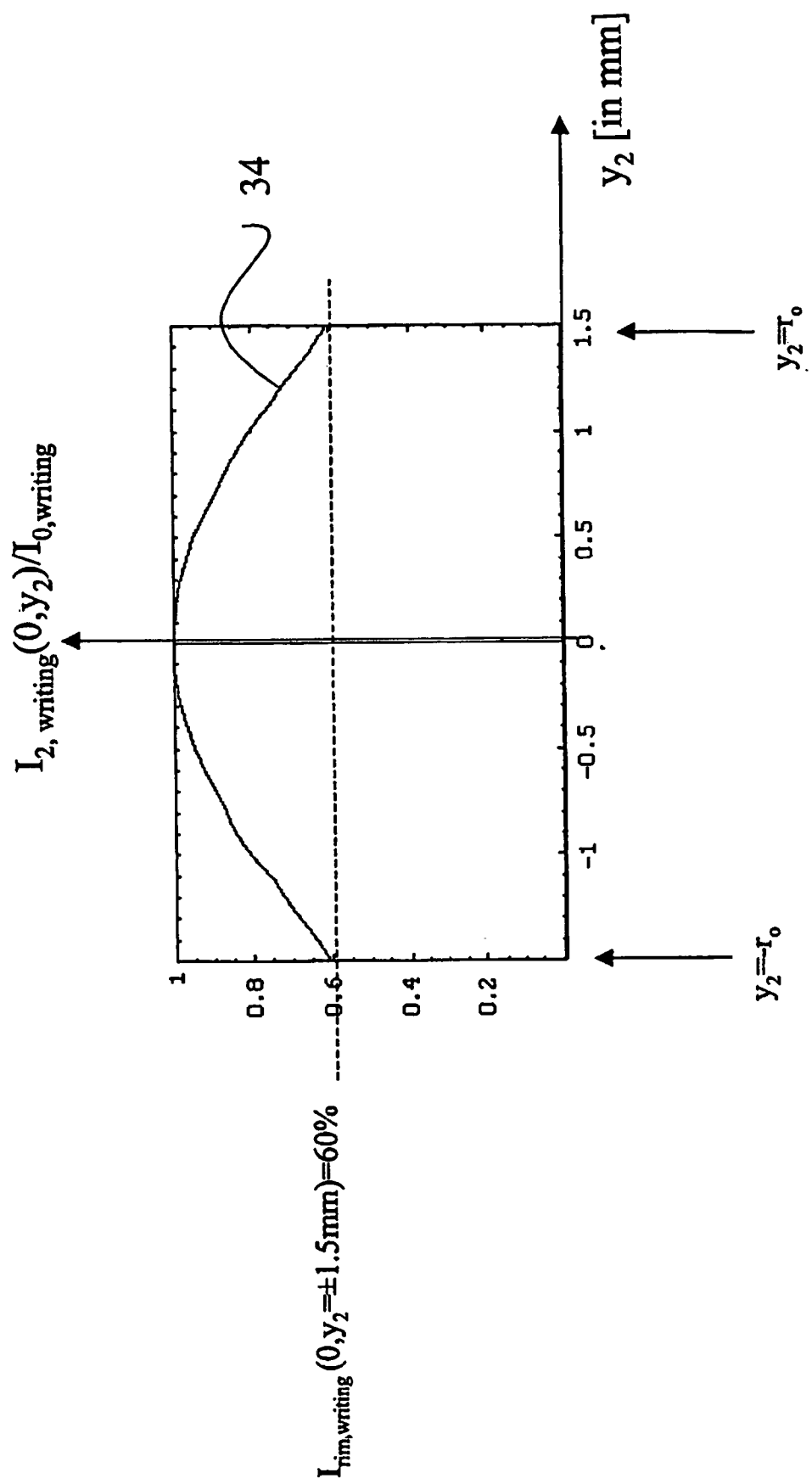
Figure 4A:
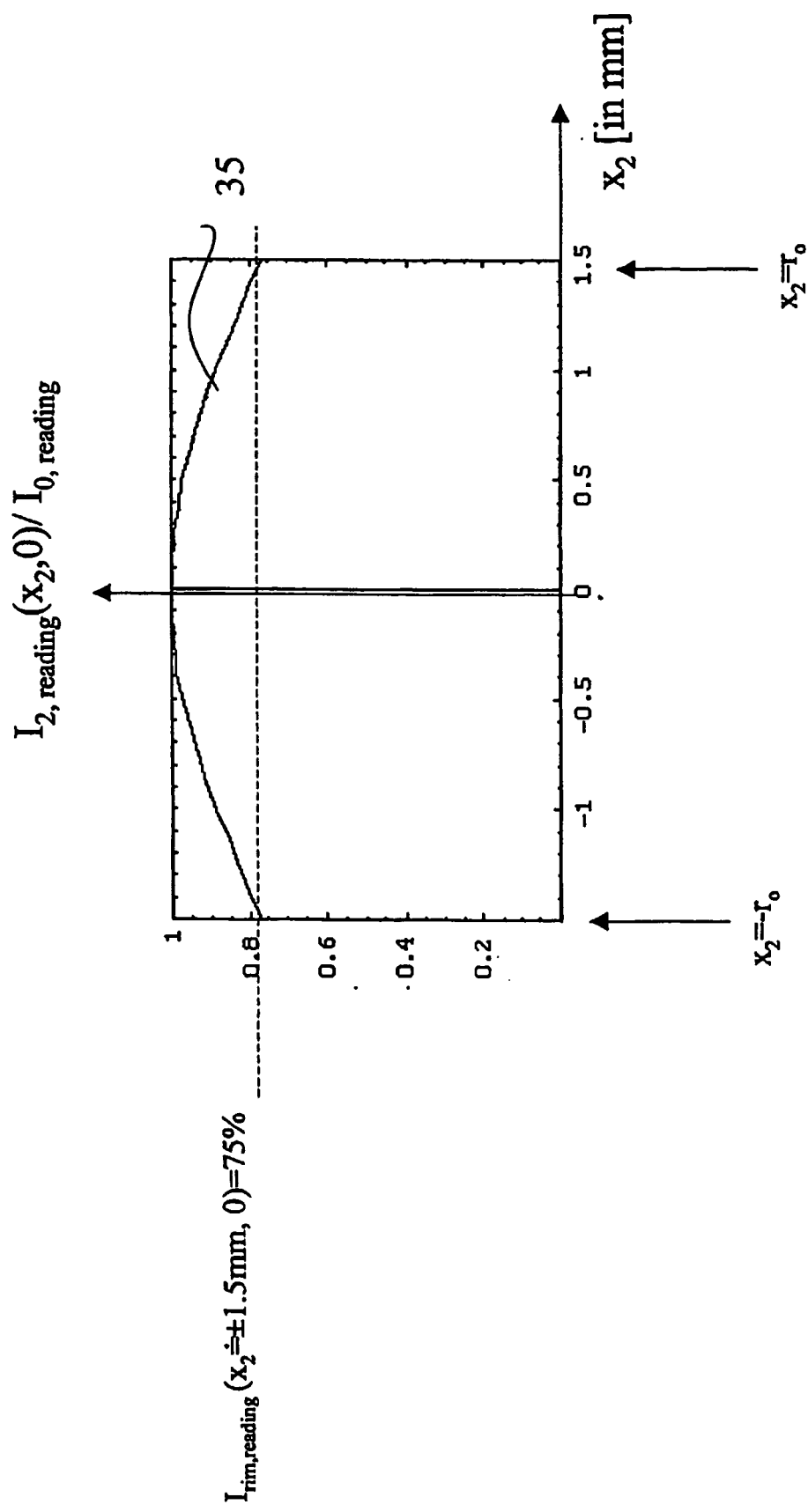
Figure 4B:
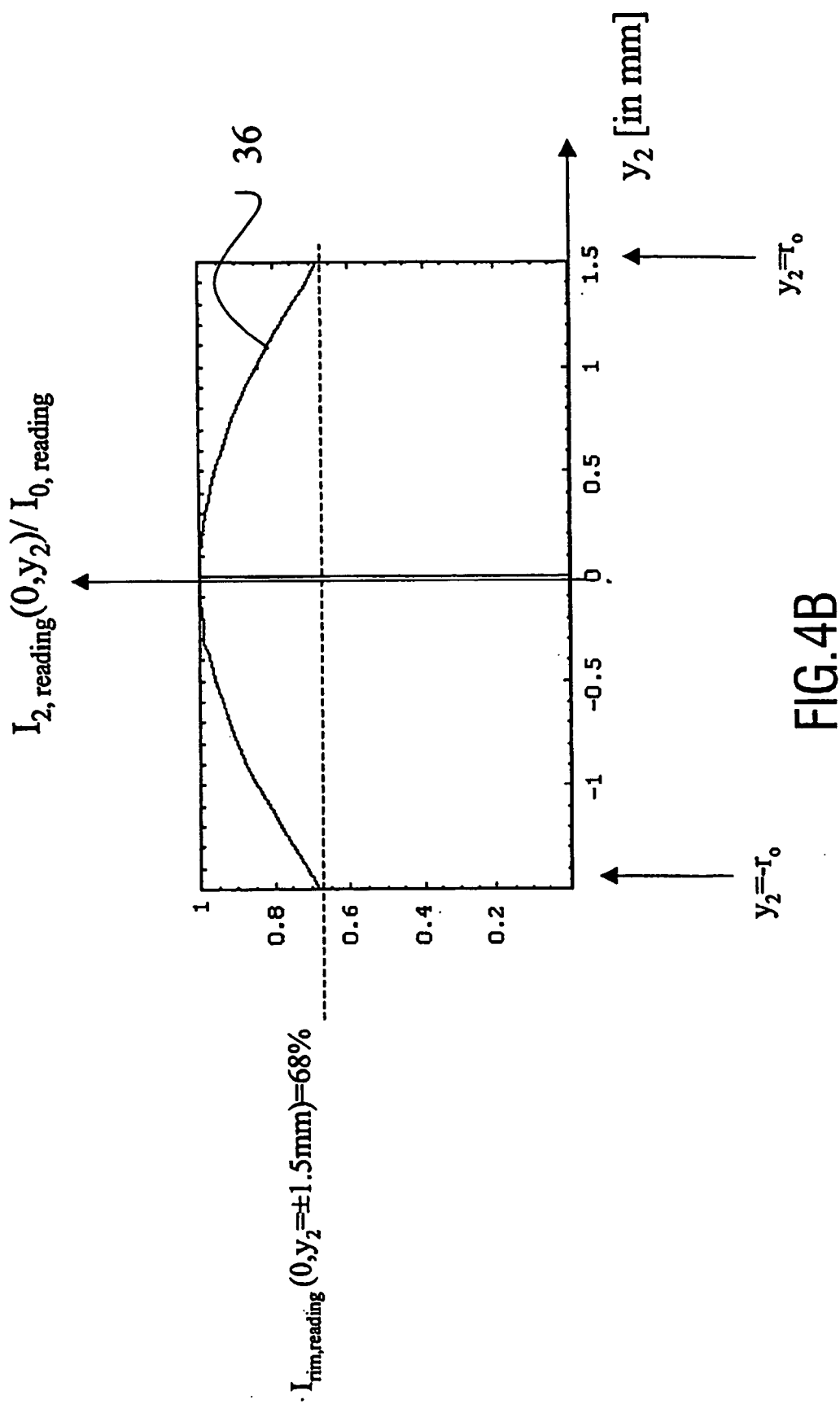
Figure 5:
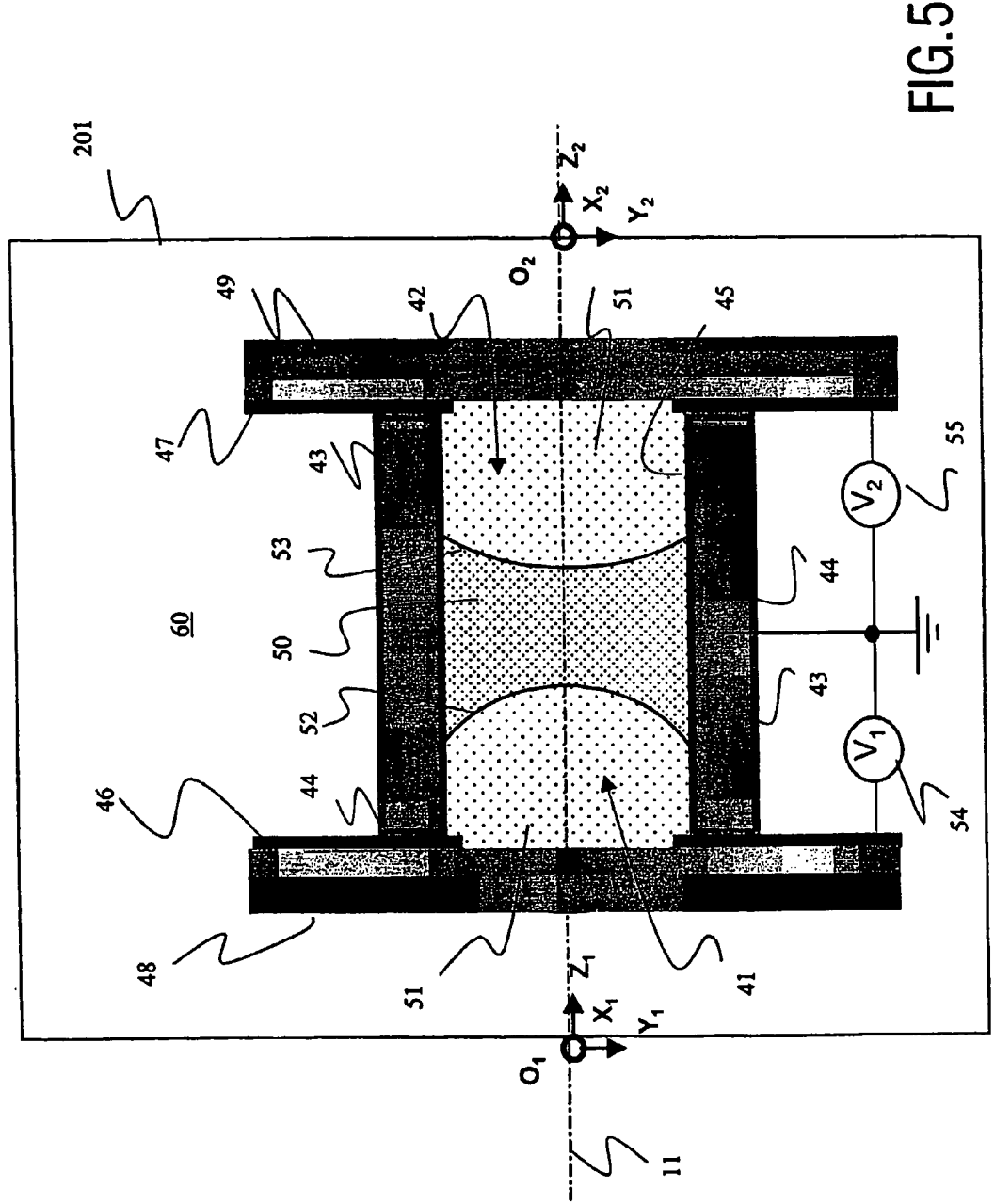
Figure 6A:
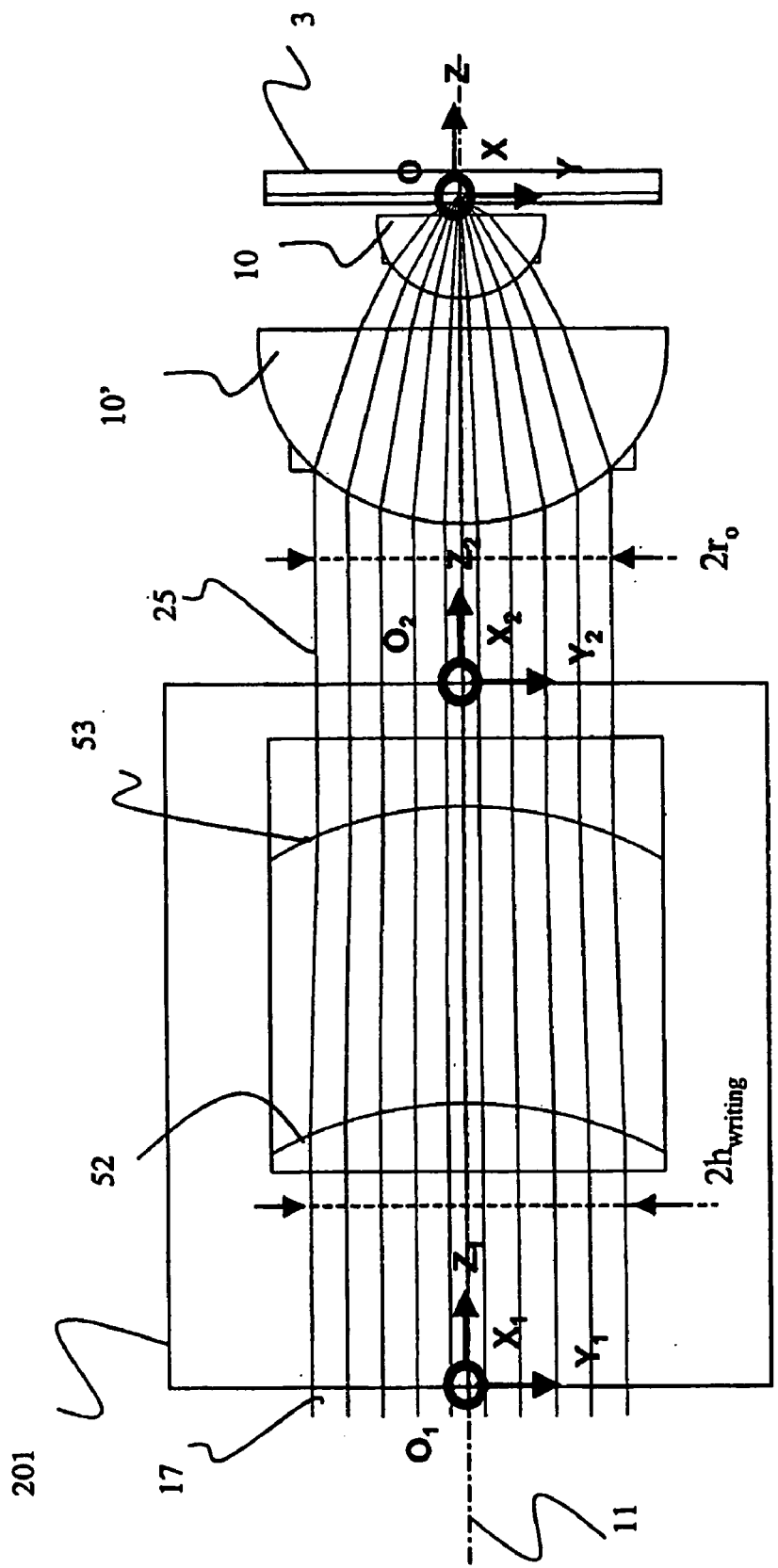
Figure 6B:
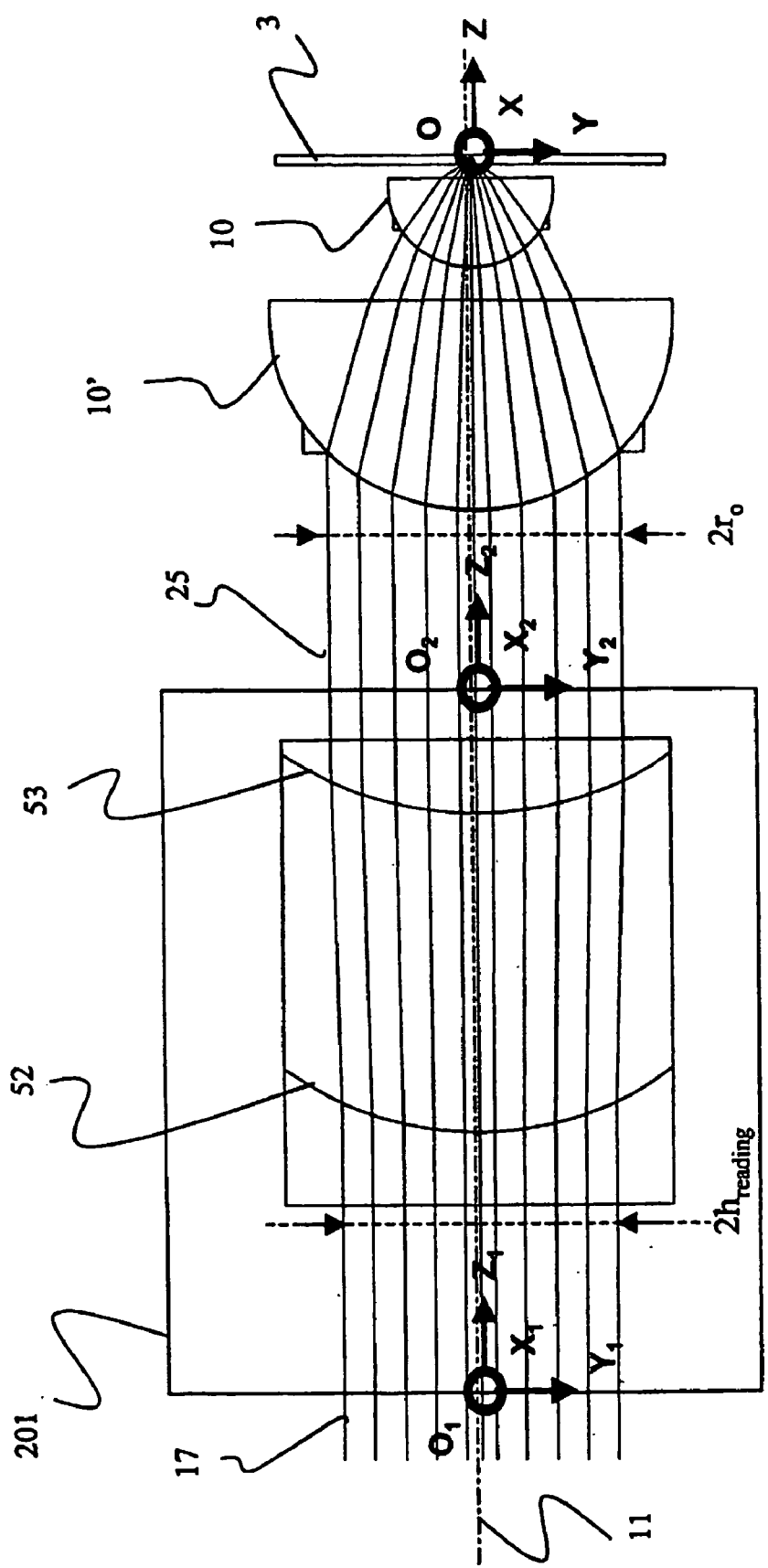
Figure 7:
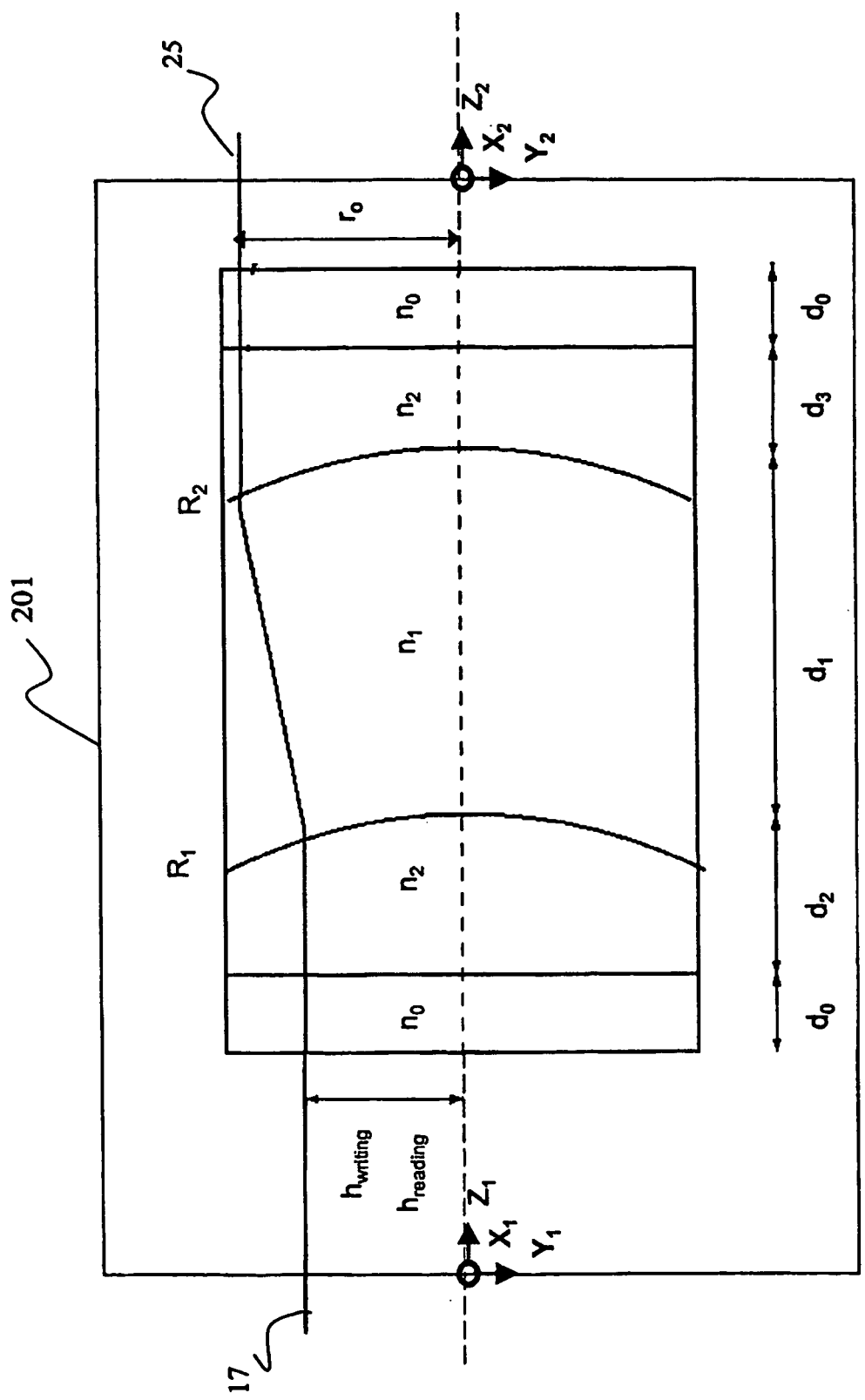
Figure 8:
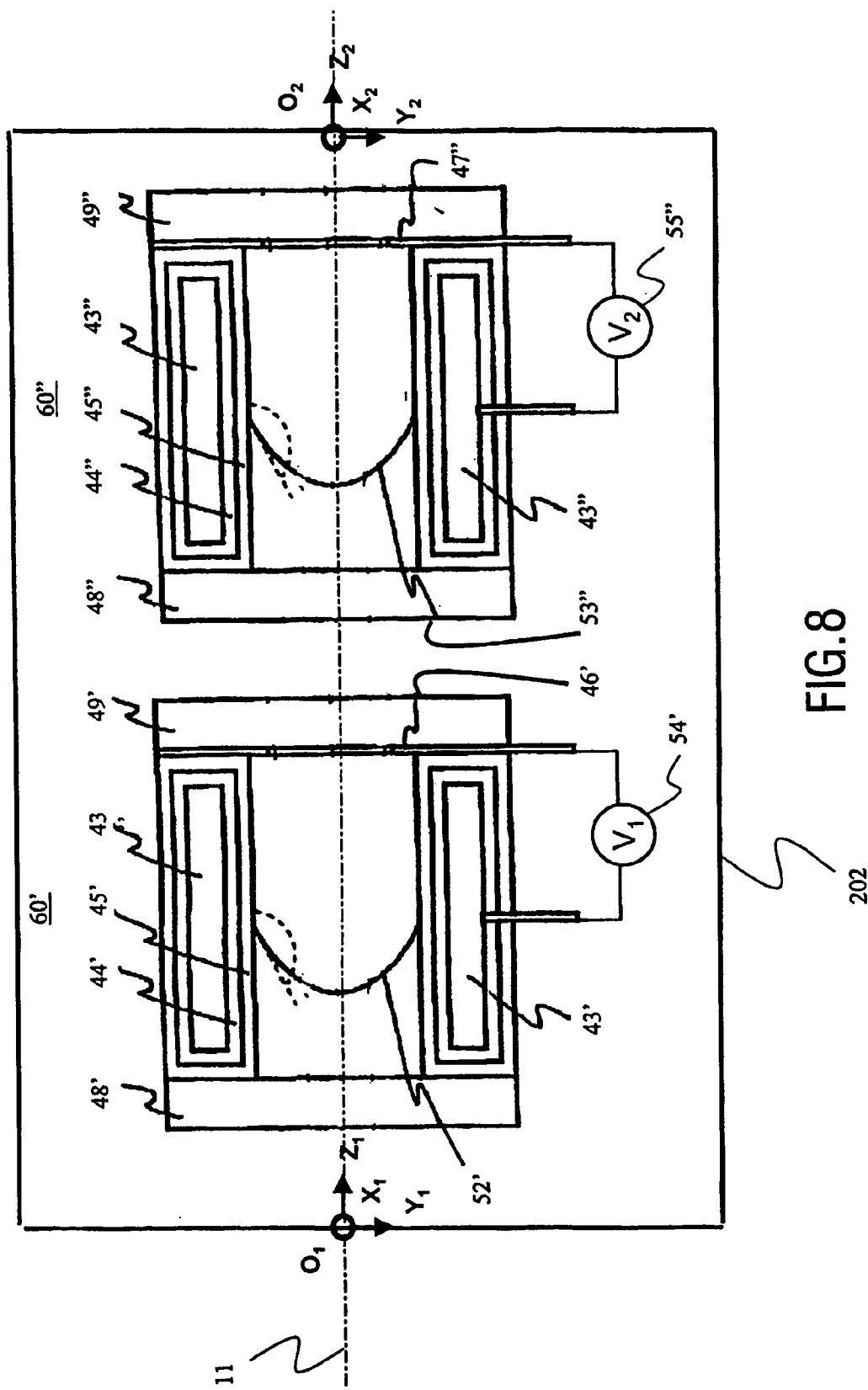
Figure 9:
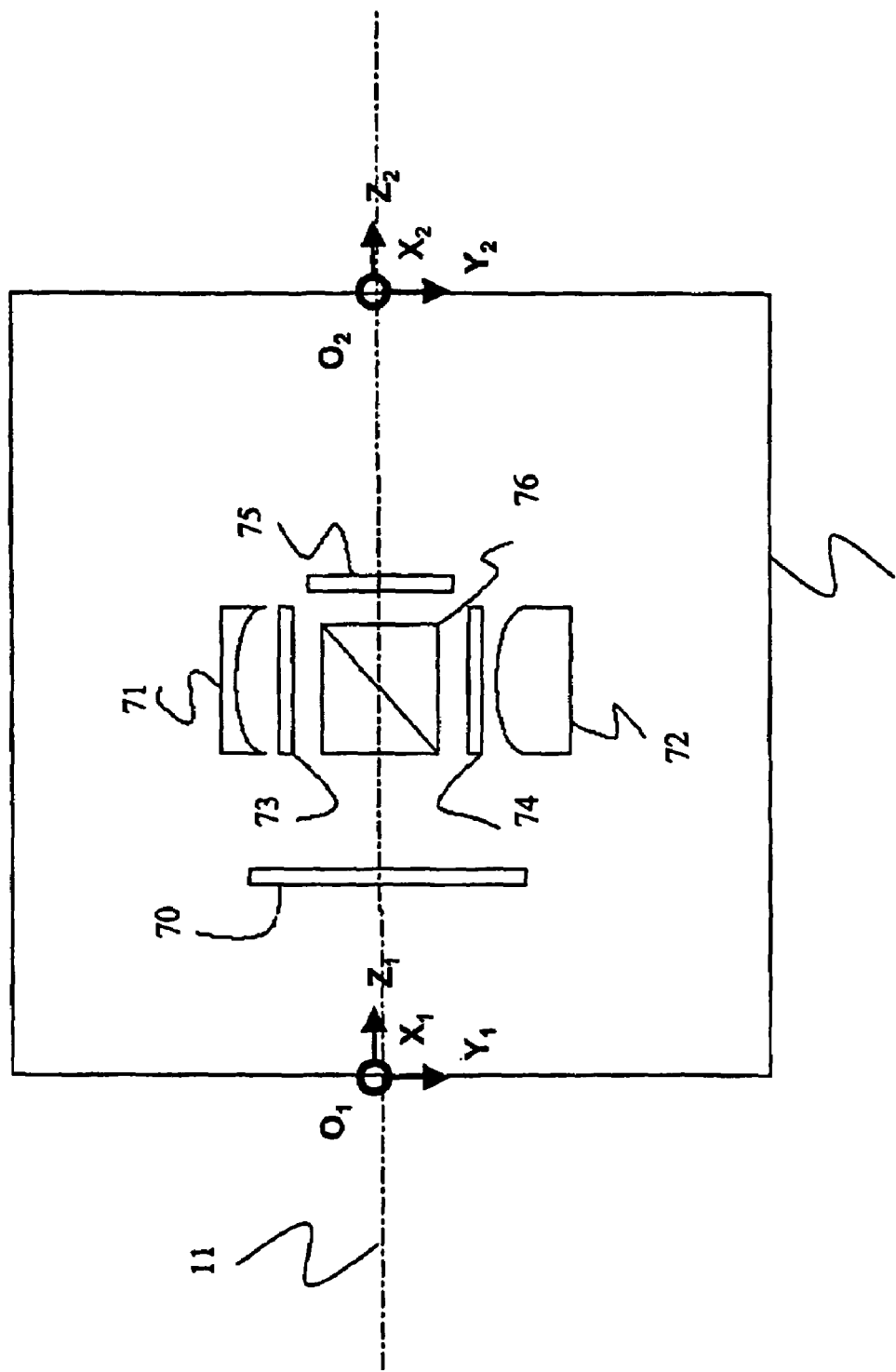
Figure 10A:
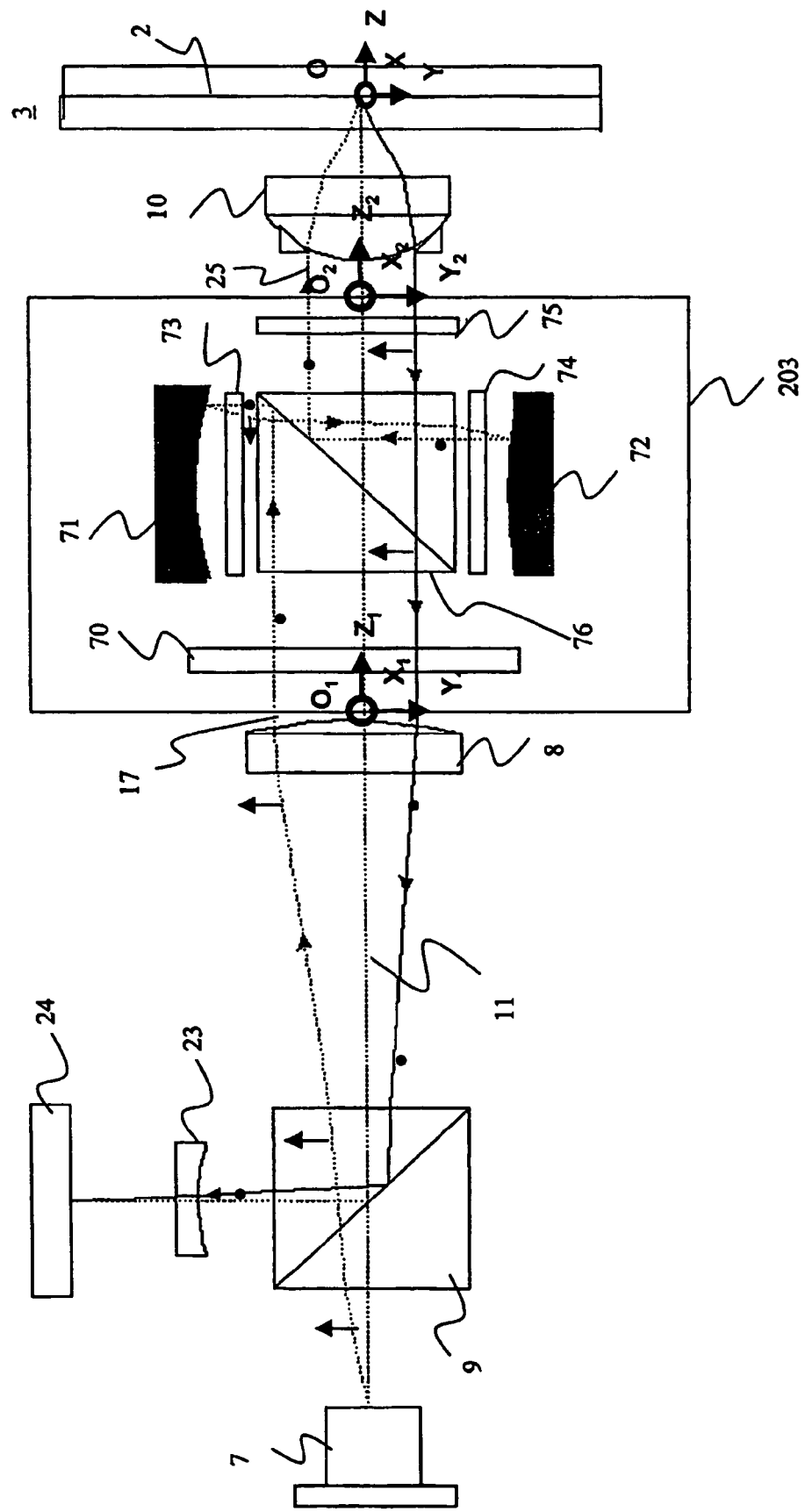
Figure 10B:
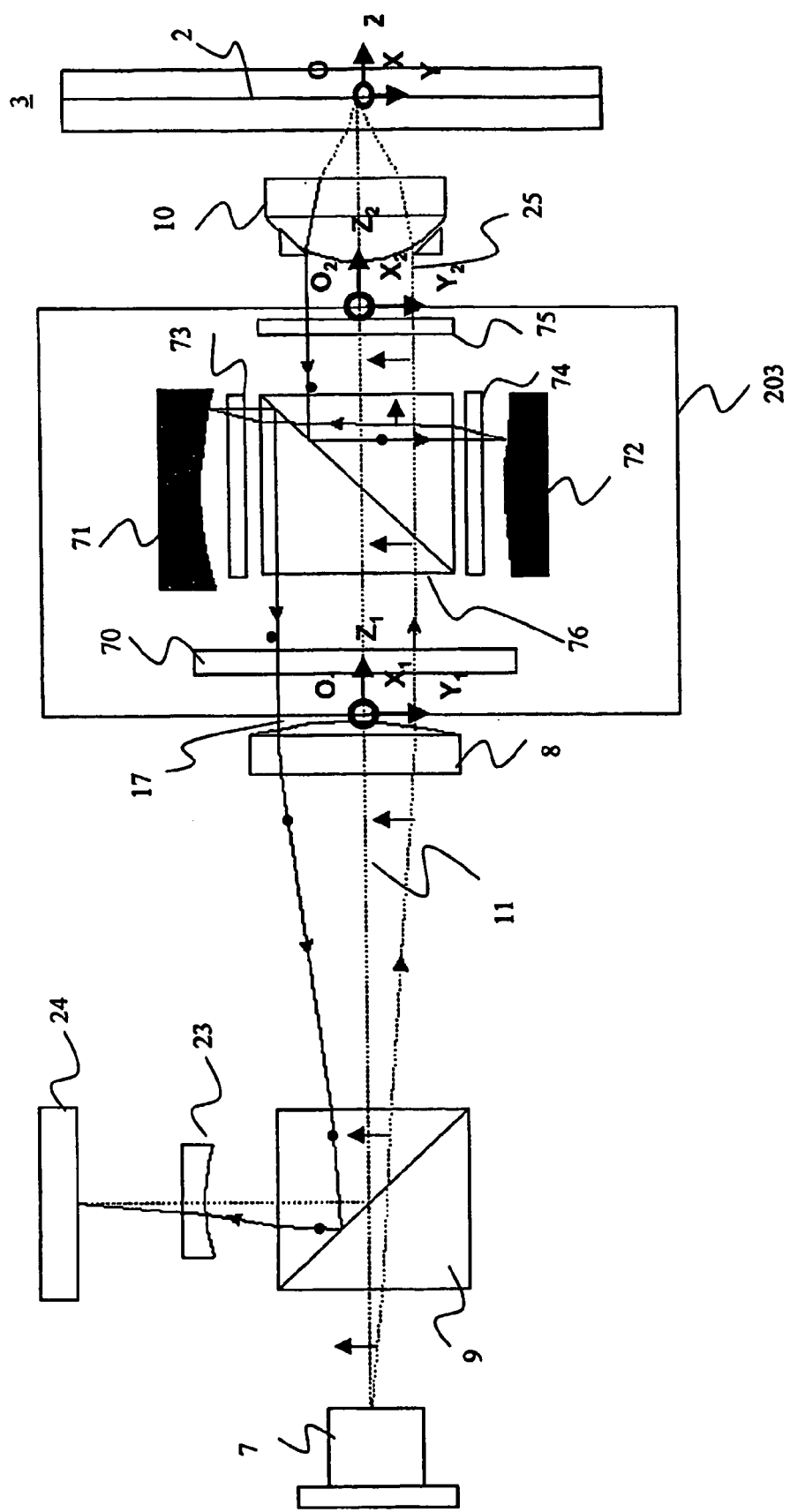

The objects, advantages and features of the invention will be apparent from the following, more detailed description of the invention, as illustrated in the accompanying drawings, in which:

FIG. 1 is a schematic illustration of components of the optical scanning device according to the invention, FIGS. 2A and 2B show two respective curves representing the intensity at the entrance pupil of the power switch of the scanning device shown in FIG. 1 operating at either the writing or reading mode, FIGS. 3A and 3B show two respective curves representing at the writing mode the intensity at the exit pupil of the power switch of the scanning device shown in FIG. 1 operating at the writing mode, FIGS. 4A and 4B show two respective curves representing the intensity at the exit pupil of the power switch of the scanning device shown in FIG. 1 operating at the reading mode, FIG. 5 shows a cross-section of a first embodiment of the power switch shown in FIG. 1, FIG. 6A shows certain optical components of the scanning device shown in FIG. 1 provided with the power switch shown in FIG. 5, operating at the writing mode, FIG. 6B shows certain optical components of the scanning device shown in FIG. 1 provided with the power switch shown in FIG. 5, operating at the reading mode, FIG. 7 shows a schematic cross-section of the power switch shown in FIG. 5, FIG. 8 shows a cross-section of a second embodiment of the power switch shown in FIG. 1, FIG. 9 shows a third embodiment of the power switch shown in FIG. 1, FIG. 10A shows certain optical components of the scanning device shown in FIG. 1 provided with the power switch shown in FIG. 9, operating at the writing mode, and FIG. 10B shows certain optical components of the scanning device shown in FIG. 1 provided with the power switch shown in FIG. 9, operating at the reading mode.

FIG. 1 is a schematic illustration of components of the optical scanning device according to the invention, designated by the numeral reference 1. The optical scanning device 1 is capable of scanning at least one information layer 2 of at least one optical record carrier 3 by means of a radiation beam 4 in a first, writing mode and in a second, reading mode.

By way of illustration, the optical record carrier 3 includes a transparent layer 5 on one side of which the information layer 2 is arranged. The side of the information layer facing away from the transparent layer 5 is protected from environmental influences by a protective layer 6. The transparent layer 5 acts as a substrate for the optical record carrier 3 by providing mechanical support for the information layer 2. Alternatively, the transparent layer 5 may have the sole function of protecting the information layer 2, while the mechanical support is provided by a layer on the other side of the information layer 2, for instance by the protective layer 6 or by an additional information layer and transparent layer connected to the uppermost information layer. It is noted that the information layer has an information layer depth 7 that corresponds to the thickness of the transparent layer 5. The information layer 2 is a surface of the carrier 3.

That surface contains at least one track, i.e. a path to be followed by the spot of a focused radiation on which path optically-readable marks are arranged to represent information. The marks may be, e.g., in the form of pits or areas with a reflection coefficient or a direction of magnetization different from the surroundings.

The optical scanning device 1 includes a radiation source 7, a collimator lens 8, a first beam splitter 9, a scanning spot power switch 20, an objective lens 10 having an optical axis 11, and a detection system 12. Furthermore, the optical scanning device 1 includes a servocircuit 13, a focus actuator 14, a radial actuator 15, and an information processing unit 16 for error correction.

In the following "Z-axis" corresponds to the optical axis 11 of the objective lens 8. "O" is the point of intersection between the optical axis 11 and the information plane 2. In the case where the optical record carrier 3 has the shape of a disc, the following is defined with respect to a given track: the "radial direction" is the direction of a reference axis, the X-axis, between the track and the center of the disc and the "tangential direction" is the direction of another axis, the Y-axis, that is tangential to the track and perpendicular to the X-axis. It is noted that (O, X, Y, Z) forms an orthogonal base associated with the position of the information plane 2.

The radiation source 7 supplies the radiation beam 4 at a wavelength λ. For example, the radiation source 7 comprises a semiconductor laser for supplying the radiation beam 4.

The collimator lens 8 is arranged along the optical path of the radiation beam 4 and, in that embodiment, between the radiation source 7 and the beam splitter 9. The collimator lens 8 transforms the radiation beam 4 into a substantially collimated beam 17. The collimator lens 8 has an optical axis that is the same as the optical axis 1 of the objective lens 10.

The first beam splitter 9 is arranged between the radiation source 7 and the power switch 20 and, in that embodiment, the collimator lens 8 and the power switch 20. The splitter 9 transmits the collimated radiation beam 17 toward the objective lens 10. Preferably, the beam splitter 9 is formed with a plane parallel plate that is tilted with an angle α with respect to the Z-axis and, more preferably, α=45°.

The scanning spot power switch 20 is arranged in the optical path of the radiation beam 17 and, in the embodiment shown in FIG. 1, between the collimator lens 8 and the objective lens 10. The power switch 20 has an entrance pupil plane 20a facing the beam splitter 9 and an exit pupil plane 20b facing the objective lens 10. In the embodiment shown in FIG. 1 "$O_1$" is the point of intersection between the optical axis 11 and the entrance plane 20a, "$X_1$-axis" and "$Y_1$-axis" are two axes of the entrance plane 20a that are orthogonal to each other, and "$Z_1$-axis" is the axis normal to the entrance plane 20a and passing through the point $O_1$. It is noted that ($O_1$, $X_1$, $Y_1$, $Z_1$) forms an orthogonal base associated with the position of the entrance plane 20a. It is also noted in the embodiment shown in FIG. 1 that the entrance plane 20a is centered on the optical axis 11 of the objective lens 10: the $X_1$-, $Y_1$- and $Z_1$-axes are therefore parallel to the X-, Y- and Z-axes, respectively. Likewise, "$O_2$" is the point of intersection between the optical axis 11 and the exit plane 20b, "$X_2$-axis" and "$Y_2$-axis" are two axes of the exit plane 20b that are orthogonal to each other, and "$Z_2$-axis" is the axis normal to the exit plane 20b and passing through the point $O_2$. It is noted that ($O_2$, $X_2$, $Y_2$, $Z_2$) forms an orthogonal base associated with the position of the exit plane 20b. It is also noted in the embodiment shown in FIG. 1 that the exit plane 20b is centered on the optical axis 11 of the objective lens 10: the $X_2$-, $Y_2$- and $Z_2$-axes are therefore parallel to the X-, Y- and Z-axes, respectively.

The power switch 20 is arranged for modifying the light power of the scanning spot 19 so that the spot has a first light power level $P_{writing}$ at the writing mode and a second, lower light power level $P_{reading}$ at the reading mode. Thus, the power switch 20 transforms the radiation beam 17 entering the entrance plane 20a into a radiation beam 25 emerging from the exit plane 20b, where the radiation beam 17 has an intensity $I_1$ in the entrance plane 20a at both writing and reading modes and the radiation beam 25 has, in the exit plane 20b, an intensity $I_{2,writing}$ at the writing mode and a different intensity $I_{2,reading}$ at the reading mode. The incident beam 17 has the same intensity profile ($I_1$) at both writing and reading modes and the emerging beam 25 has two different intensity profiles, $I_{2,writing}$ at the writing mode and $I_{2,reading}$ at the reading mode. The power switch 20 is described further in detail.

The objective lens 10 transforms the radiation beam 25 (that is substantially collimated in the embodiment shown in FIG. 1) to a focused radiation beam 18 so as to form a scanning spot 19 in the position of the information layer 2. In the embodiment shown in FIG. 1 the lens 10 has an entrance pupil 10a and an exit pupil 10b that are rotational symmetric with respect to the optical axis 11: the entrance pupil 10a has a circular rim or border. In the following "$r_o$" is the radius (positive value) of the entrance pupil 10a and by way of illustration only $r_o$ is equal to 1.5 mm. It is noted that the objective lens may be formed as a hybrid lens such as a lens combining refractive elements, used in an infinite-conjugate mode. Such a hybrid lens may be formed by means of either a diamond turning process or a lithographic process using the photopolymerization of, e.g., an UV curing lacquer. It is also noted that the objective lens 10 shown in FIG. 1 is formed as a convex-convex lens; however, other lens element types such as plano-convex or convex-concave lenses can be used. Furthermore, the optical scanning device 1 may include a pre-objective lens (not shown in FIG. 1 but shown by way of illustration only in FIGS. 6A and 6B and designated with the reference numeral 10'). Such a pre-objective lens is arranged between the collimator lens 8 and the objective lens 10 so as to form a compound objective lens system. Alternatively, the objective lens system may contain more than one pre-objective lens.

During scanning the record carrier 3 rotates on a spindle (not shown in FIG. 1) and the information layer 2 is then scanned through the transparent layer 5. The focused radiation beam 18 reflects on the information layer 2, thereby forming a reflected beam 21 which returns on the optical path of the forward converging beam 18. The objective lens 10 transforms the reflected radiation beam 21 to a reflected substantially collimated radiation beam 22. The beam splitter 9 separates the forward radiation beam 17 from the reflected radiation beam 22 by transmitting at least a part of the reflected radiation beam 22 towards the detection system 12.

The detection system 12 includes a convergent lens 23 and a quadrant detector 24 for capturing said part of the reflected radiation beam 22. The quadrant detector 24 converts the part of the reflected radiation beam 22 to one or more electrical signals. One of the signals is an information signal $I_{data}$, the value of which represents the information scanned on the information layer 2. The information signal $I_{data}$ is processed by the information processing unit 16 for error correction. Other signals from the detection system 12 are a focus error signal $I_{focus}$ and a radial tracking error signal $I_{radial}$. The signal $I_{focus}$ represents the axial difference in height along the Z-axis between the scanning spot 19 and the position of the information layer 2. Preferably, the signal $I_{focus}$ is formed by the "astigmatic method" which is known from, inter alia, the book by G. Bouwhuis, J. Braat, A. Huijser et al, entitled "Principles of Optical Disc Systems," pp. 75–80 (Adam Hilger 1985) (ISBN 0-85274-785-3). The radial tracking error signal $I_{radial}$ represents the distance in the XY-plane of the information layer 2 between the scanning spot 19 and the center of a track in the information layer 2 to be followed by the scanning spot 19. Preferably, the signal $I_{radial}$ is formed from the "radial push-pull method" which is known from, inter alia, the book by G. Bouwhuis, pp. 70–73.

The servocircuit 13 is arranged for, in response to the signals $I_{focus}$ and $I_{radial}$, providing servo control signals $I_{control}$ for controlling the focus actuator 14 and the radial actuator 15, respectively. The focus actuator 14 controls the position of the objective lens 10 along the Z-axis, thereby controlling the position of the scanning spot 19 such that it coincides substantially with the plane of the information layer 2. The radial actuator 14 controls the position of the objective lens 10 along the X-axis, thereby controlling the radial position of the scanning spot 19 such that it coincides substantially with the center line of the track to be followed in the information layer 2.

The power switch 20 is now described in further detail. As already mentioned, at the writing mode, the power switch 20 transforms the radiation beam 17 having the intensity $I_1$ in the entrance plane 20a into the radiation beam 25 having the intensity $I_{2,writing}$ in the exit plane 20b so that the light power P of the scanning spot 19 equals the high power level $P_{writing}$. At the reading mode, the power switch 20 transforms the radiation beam 17 having the same intensity $I_1$ in the entrance plane 20a into the radiation beam 25 having the intensity $I_{2,reading}$ in the exit plane 20b so that the light power P of the scanning spot 19 equals the low power level $P_{reading}$.

FIG. 2A shows a curve 31 representing along the $X_1$-axis the intensity $I_1$ at the entrance pupil of the power switch 20. FIG. 2B shows a curve 32 representing along the $Y_1$-axis the intensity $I_1$ at the entrance pupil of the power switch 20. As shown in FIGS. 2A and 2B, the intensity $I_1$ has a Gaussian-like profile:

$$I_1(x_1, y_1) = I_0 e^{-(\frac{x_1}{A})^2 - (\frac{y_1}{B})^2} \qquad (1)$$

where "$I_1(x_1,y_1)$" is the value of the intensity $I_1$ at a point of coordinates $(x_1,y_1)$ in the Cartesian coordinate system $(O_1, X_1, Y_1)$, "$I_0$" is the maximum of the intensity $I_1$ (i.e. the intensity of the central ray of the radiation beam 17) and "A" and "B" are two constant parameters that depend inter alia on the radiation source 7. In the embodiment shown in FIG. 1 the parameters A and B also depend on the optical components arranged between the radiation source 7 and the power switch 10, e.g. on the collimator lens 8. In the following and by way of illustration only the radiation beam 4 emitted from the radiation source 7 has an elliptical cross-section and the parameters A and B therefore differ from each other. For example only, the parameters A and B are equal to 2.68 and 2.24, respectively. It is noted that in the case where the radiation beam 17 has a circular cross-section the parameters A and B are equal to each other.

FIG. 3A shows a curve 33 representing along the $X_2$-axis the intensity $I_{2,writing}$ at the exit pupil 20b of the power switch 20. FIG. 3B shows a curve 34 representing along the $Y_2$-axis the intensity $I_{2,writing}$ at the exit pupil 20b of the power switch 20. As shown in FIGS. 3A and 3B, the intensity $I_{2,writing}$ has a Gaussian-like profile:

$$I_{2,writing}(x_2, y_2) = I_{0,writing} \cdot e^{-(\frac{x_2}{C})^2 - (\frac{y_2}{D})^2} \qquad (2)$$

where "$I_{2,writing}(x_2,y_2)$" is the value of the intensity $I_{2,writing}$ at a point of coordinates $(x_2,y_2)$ in the Cartesian coordinate system $(O_2, X_2, Y_2)$, "$I_{0,writing}$" is the maximum of the intensity $I_{2,writing}$ (i.e. the intensity of the central ray of the radiation beam 25 at the writing mode) and "C" and "D" are two constant parameters that depend on the parameters A and B and on design parameters of the power switch 20 in respect of the writing mode. In the following and by way of illustration only the parameters C and D are equal to 2.51 and 2.10, respectively. It is noted that in the case where the radiation beam 17 has a circular cross-section the parameters C and D are equal to each other.

FIG. 4A shows a curve 35 representing along the $X_2$-axis the intensity $I_{2,reading}$ at the exit pupil 20b of the power switch 20. FIG. 4B shows a curve 36 representing along the $Y_2$-axis the intensity $I_{2,reading}$ at the exit pupil 20b of the power switch 20. As shown in FIGS. 3A and 3B, the intensity $I_{2,reading}$ has a Gaussian-like profile:

$$I_{2,reading}(x_2, y_2) = I_{0,reading} \cdot e^{-(\frac{x_2}{E})^2 - (\frac{y_2}{F})^2} \qquad (3)$$

where "$I_{2,reading}(x_2,y_2)$" is the value of the intensity $I_{2,reading}$ at a point of coordinates $(x_2,y_2)$ in the Cartesian coordinate system $(O_2, X_2, Y_2)$, "$I_{0,reading}$" is the maximum of the intensity $I_{2,reading}$ (i.e. the intensity of the central ray of the radiation beam 25 at the reading mode) and "E" and "F" are two constant parameters that depend on the parameters A and B and on design parameters of the power switch 20 in respect of the reading mode. In the following and by way of illustration only the parameters E and F are equal to 2.87 and 2.40, respectively. It is noted that in the case where the radiation beam 17 has a circular cross-section the parameters E and F are equal to each other. It is also noted that the maximum intensities $I_0$, $I_{0,writing}$ and $I_{0,reading}$ may differ from each other.

More specifically, in order to transform the intensity $I_1$ into the intensity $I_{2,writing}$ or $I_{2,reading}$, the power switch 20 modifies the size of the radiation beam 25 entering the objective lens 10 at the writing or reading mode. In the present description the "size" of a radiation beam refers, if the beam has an elliptical cross-section, to the length of the long or short axis and, if the beam has a circular cross-section, to the radius of that circular cross-section. Also in the present description the "cross-section" of a radiation beam refers to the cross-section of the beam in a plane that is perpendicular to the central ray of the beam.

Thus, the power switch 20 is arranged so that, at the writing mode, the radiation beam 25 has a first large size in order to have a first low rim intensity level $I_{rim,writing}$ so that the scanning spot 19 has the high power level $P_{writing}$. The power switch 20 is also arranged so that, at the reading mode, the radiation beam 25 has a second small size (i.e. smaller than said first size) in order to have a second high rim intensity level $I_{rim,reading}$ (i.e. higher than the rim intensity level $I_{rim,writing}$) so that the scanning spot 19 has the low power level $P_{reading}$. In other words, by comparison with the size of the incident beam 17, the power switch 20 decreases the size of the emerging beam 25 at the writing mode and increases the size of the emerging beam 25 at the reading mode.

In the preferred case where the circular entrance pupil 10a (having the radius $r_o$) of the objective lens 10 is fully filled, the high and low power levels $P_{writing}$ and $P_{reading}$ are given by the following equations:

$$P_{writing} = \int_{|x_2|,|y_2| \leq r_o} \int I_{2,writing}(x_2, y_2) dx_2 \, dy_2 \quad (4a)$$

$$P_{reading} = \int_{|x_2|,|y_2| \leq r_o} \int I_{2,reading}(x_2, y_2) dx_2 \, dy_2 \quad (4b)$$

provided that that the light power P of the scanning spot equals the light power of the radiation beam 25 in the entrance pupil 10a. This occurs where transmission loss due to absorption of the objective lens 10 is negligible.

Furthermore, it is noted that, at the writing mode, any rim ray of the radiation beam 25 comes from a ray of the radiation beam 17 that is entering the entrance plane 20a at a first point of Cartesian coordinates $(x_1, y_1)$, wherein the distance between that first point and the point $O_1$ equals a first distance $h_{writing}$ that is constant regardless of the ray. Therefore, at the writing mode, the coordinates $(x_1, y_1)$ of that first point are given by the following equation.

$$x_1^2 + y_1^2 = h_{writing}^2 \quad (5a)$$

Likewise, at the reading mode, any rim ray of the radiation beam 25 comes from a ray of the radiation beam 17 that is entering the entrance plane 20a at a second point of Cartesian coordinates $(x_1, y_1)$, wherein the distance between that second point and the point $O_1$ equals a second distance $h_{reading}$ that is constant regardless of the ray. Therefore, at the reading mode, the coordinates $(x_1, y_1)$ of that second point are given by the following equation.

$$x_1^2 + y_1^2 = h_{reading}^2 \quad (5b)$$

Thus, it derives from Equations (4a), (4b), (5a) and (5b) that:

$$P_{writing} = \int_{|x_1|,|y_1| \leq h_{writing}} \int I_1(x_1, y_1) dx_1 \, dy_1 \quad (6a)$$

$$P_{reading} = \int_{|x_1|,|y_1| \leq h_{reading}} \int I_1(x_1, y_1) dx_1 \, dy_1 \quad (6b)$$

By properly designing the power switch 20 (as explained in detail further) the heights $h_{writing}$ and $h_{reading}$ can be chosen so that the rim intensity levels $I_{rim,writing}$ and $I_{rim,reading}$ equal different desired values and therefore the power levels $P_{writing}$ and $P_{reading}$ equal to different desired values. By way of illustration only, Table I shows desired values of the rim intensity levels $I_{rim,writing}$ and $I_{rim,reading}$ along the $X_2$-axis and the $Y_2$-axis, the corresponding heights $h_{writing}$ and $h_{reading}$ along the $X_1$-axis and the $Y_1$-axis (according to FIGS. 2A and 2B), and the resulting light power levels $P_{writing}$ and $P_{reading}$ (according to Equations (6a) and (6b)).

TABLE I

| | $I_{rim,writing}$ | $I_{rim,reading}$ | $h_{writing}$ | $h_{reading}$ | $P_{writing}$ | $P_{reading}$ |
|---|---|---|---|---|---|---|
| $X_1$- or $X_2$-axis | 70% | 75% | 1.6 mm | 1.4 mm | $6.530 I_0$ | $5.242 I_0$ |
| $Y_1$- or $Y_2$-axis | 60% | 68% | 1.6 mm | 1.4 mm | | |

It is noted in Table I that the ratio $P_{writing}/P_{reading}$ approximately equals 1.25 in absence of transmission loss in the optical path of the radiation beam. It is also noted that the rim intensity of the radiation beam 25 is lower at the writing mode than at the reading mode and that the power light of the scanning spot 19 is larger at the writing mode than at the reading mode. Thus, the optical scanning device 1 allows scanning of the optical record carrier 3 by means of the radiation beam 25 that has a high light power at the writing mode and a high rim intensity at the reading mode.

It is also noted that the power switch 20 forms a telescope-like arrangement having both object and image conjugates at the infinity, where the telescopic arrangement has a switchable transverse magnification between the writing and reading modes. Thus, the magnification telescopic arrangement equals $$\frac{r_o}{h_{writing}}$$

at the writing mode and $$\frac{r_o}{h_{reading}}$$

at the reading mode.

Three embodiments of the scanning spot power switch shown in FIG. 1 are now described in detail.

The first embodiment 201 of the scanning spot power switch 20, hereafter designated by the reference numeral 201, is now described. FIG. 5 shows a cross-section in the $Y_1 Z_1$-plane of the power switch 201. In that embodiment the power switch 201 comprises two variable focus lens elements 41 and 42 in the form of an electrowetting device 60. It is noted that the principle of the variable focus lens is described in detail in PH NL020163 and PH NL011095.

The electrowetting device 60 comprises a cylinder 43 of conductive material. The cylinder 43 is coated with an insulating layer 44. The inner side of the cylinder is provided with a fluid contact layer 45. The conductive cylinder 43 forms a common first electrode for the lens elements 41 and 42. The second electrode of the first lens element 41 is constituted by an annular conductive layer 46 having a central transparent area for passing radiation. A conductive layer 47 at the exit side forms the second electrode of the second lens element 42. Two transparent layers 48 and 49 may cover the conductive layers 46 and 47, respectively. The central portion of the cylinder 43 is filled with a first, transparent and non-conductive fluid (liquid or vapor) 50. At each side of the fluid 50, a second, transparent and conductive, fluid (liquid or vapor) 51 is present. The fluid 51 has a first refractive index $n_1$ and the fluid 50 has a second refractive index $n_2$. In that embodiment the first refractive index $n_1$ is lower than the second refractive index $n_2$. By way of illustration only, in the embodiment shown in FIG. 5, the first fluid 50 is water ($n_1$=1.349) and the second fluid 51 is oil, e.g. polydimethyl(8–12%)-phenylmethylsiloxame copolymer ($n_2$=1.425). Alternatively, the first fluid 50 may be oil and the second fluid 51 may be water. Also alternatively, the fluid present at the exit side may differ from the fluid present at the entrance side. The non-miscible fluids 50 and 51 at the entrance side of the power switch 201 (i.e. the side facing the $X_1Y_1$-plane) are separated by a first meniscus 52 which forms the first variable focus lens element 41. The fluids 50 and 51 at the exit side of the power switch 201 (i.e. the side facing the $X_2Y_2$-plane) are separated by a second meniscus 53 which forms the second variable focus lens element 42. In the following "$R_1$" is the radius of curvature of the first meniscus 52 and "$R_2$" is the radius of curvature of the second meniscus 53. The curvature of the menisci and thus the focal distance of the lens elements 41 and 42 can be changed independently form each other by means of controllable voltage sources 54 and 55, respectively. In the following "$V_1$" is the voltage of the source 54 and "$V_2$" is the voltage of the source 55.

In that embodiment decreasing and increasing the size of the radiation beam 25 at the writing and reading modes, respectively, is performed by changing the radii of curvature $R_1$ and $R_2$ via adaptation of the voltages $V_1$ and $V_2$. FIG. 6A shows certain optical components of the scanning device 1 provided with the power switch 201 shown in FIG. 5, operating at the writing mode. FIG. 6B shows the same optical components operating at the reading mode.

As shown in FIG. 6A, the fist meniscus 40 has a concave curvature where the radius of curvature $R_1$ is negative and, due to the difference between the refractive indices $n_2$ and $n_1$, the lens element 41 acts as a positive, converging lens element. The second meniscus 42 has a concave curvature where the radius of curvature $R_2$ is negative and, due to the difference between the refractive indices $n_1$ and $n_2$, the second lens element 42 acts as a negative, diverging lens element.

As shown in FIG. 6B, the fist meniscus 40 has a convex curvature where the radius of curvature $R_1$ is positive and, due to the difference between the refractive indices $n_2$ and $n_1$, the lens element 41 acts as a negative, diverging lens element. The second meniscus 42 has a convex curvature where the radius of curvature $R_2$ is positive and, due to the difference between the refractive indices $n_1$ and $n_2$, the second lens element 42 acts as a positive, converging lens element.

The distances $h_{writing}$ and $h_{reading}$ depends on the radii of curvature $R_1$ and $R_2$ and other design parameters of the electrowetting device shown in FIG. 5. FIG. 7 shows a schematic cross-section of the scanning spot power switch 201 shown in FIG. 5. The path of a rim ray of the radiation beam 25 through the power switch 201 is shown in FIG. 7 by a solid line. The following design parameters are shown in FIG. 7: "$d_1$" is the thickness of the first fluid 50 along the optical axis 11, "$d_2$" is the thickness of the second fluid 51 in the entrance side along the optical axis 11, "$d_3$" is the thickness of the second fluid 51 in the exit side along the optical axis 11, "$d_0$" is the thickness of the transparent layer 48 or 49 along the optical axis 11, and "$n_0$" is the refractive index of the transparent layer 48 or 49. It has been found that, in the paraxial approximation (with a typical accuracy of 20%), the distances $h_{writing}$ and $h_{reading}$ are given, in that embodiment, by the following equations:

$$R_1 = \frac{d_1(n_1 - n_2)}{n_1\left(1 - \frac{r_o}{h_1}\right)} \quad (7a)$$

$$R_2 = R_1 + \frac{n_2 - n_1}{n_1}d_1 \quad (7b)$$

where "$h_1$" is either the distance $h_{writing}$ or the distance $h_{reading}$.

By way of illustration only, Table II shows values of the radii of curvature $R_1$ and $R_2$ in the writing and reading modes and the corresponding heights $h_{writing}$ and $h_{reading}$ that have been obtained with ray-tracing simulations.

TABLE II

| | $R_1$ [in mm] | $R_2$ [in mm] | $h_{writing}$ [in mm] | $h_{reading}$ [in mm] |
|---|---|---|---|---|
| Writing mode | −3.7 | −3.492 | 1.6 | N/A |
| Reading mode | 3.2 | 3.408 | N/A | 1.4 |

Therefore, and with reference to Table I, by a proper choice of the radii of curvature it is possible to transform the radiation beam 17 into the radiation beam 25 where the rim intensity of the beam 25 entering the objective lens 10 equals, at the writing mode, $I_{rim,writing}$ so that the light power P equals $P_{writing}$ and, at the reading mode, $I_{rim,reading}$ so that the light power P equals $P_{reading}$. It is noted that, while in the ideal case the ratio $P_{writing}/P_{reading}$ approximately equals 125% (see Table I), that ratio equals 120% in the case where the optical scanning device 1 is provided with the power switch 201 shown in FIG. 5. This results from a transmission loss of the order of 5% occurring in the second fluid (oil).

Advantageously, the power switch 201 can be made substantially more compact and consumes substantially less electric power for the switching action between the writing and reading modes than a conventional power switch. By these properties this embodiment is very suitable to be built in a miniature device for small and/or handheld and/or battery powered apparatus, for example a mobile phone, a personal digital assistant (PDA), a personal computer camera, an intercom system and an electronic game.

It is noted in FIGS. 6A and 6B that the scanning spot power switch 201 is arranged between the collimator lens 8 and the objective lens 10, thereby forming a telescope-like arrangement having both object and image conjugates at the infinity.

The second embodiment of the power switch 20, designated hereafter by the reference numeral 202, is an alternative of the power switch 201 shown in FIG. 5. FIG. 8 shows a cross-section in the $Y_1Z_1$-plane of the power switch 202 where the first and second variable focus lens elements are arranged in two different electrowetting devices 60' and 60'', respectively.

As shown in FIG. 8, the electrowetting device 60' comprises a cylinder 43' of conductive material, coated with an insulating layer 44'. The inner side of the cylinder 43' is provided with a fluid contact layer 45'. The conductive cylinder 43' forms a common electrode for said first lens element. The second electrode of said first lens element is constituted by an annular conductive layer 46' having a central transparent area for passing radiation. The device 60' is also provided with two transparent layers 48' and 49'. The layer 49' covers the conductive layer 46'. One portion of the cylinder 43' is filled with the same fluid than the first fluid 50 of the embodiment shown in FIG. 5. The other portion of cylinder is filled with the same first fluid than the second fluid 51 of the embodiment shown in FIG. 5. The non-miscible fluids 50 and 51 are separated by a meniscus 52' that has the same shape and radius of curvature than the meniscus 52 shown in FIG. 5, controlled by a voltage source 54' that provides the same voltage than the voltage $V_1$ shown in FIG. 5.

Also as shown in FIG. 8, the electrowetting device 60" comprises a cylinder 43" of conductive material, coated with an insulating layer 44". The inner side of the cylinder 43" is provided with a fluid contact layer 45". The conductive cylinder 43" forms a common electrode for said second lens element. The second electrode of said second lens element is constituted by an annular conductive layer 47" having a central transparent area for passing radiation. The device 60" is also provided with two transparent layers 48" and 49". The layer 49" covers the conductive layer 47". One portion of the cylinder 43" is filled with the same fluid than the first fluid 50 of the embodiment shown in FIG. 5. The other portion of cylinder is filled with the same first fluid than the second fluid 51 of the embodiment shown in FIG. 5. The non-miscible fluids 50 and 51 are separated by a meniscus 53" that has the same shape and radius of curvature than the meniscus 53 shown in FIG. 5, controlled by a voltage source 55" that provides the same voltage than the voltage $V_2$ shown in FIG. 5.

It is noted that the scanning spot power switch 202 is arranged between the collimator lens 8 and the objective lens 10, thereby forming a telescope-like arrangement having both object and image conjugates at the infinity.

The third embodiment of the scanning spot power switch 20, hereafter designated with the reference numeral 203, is now described. FIG. 9 shows the optical components of the power switch 203.

In the embodiment shown in FIG. 9, the radiation beam 4 (and therefore the radiation beam 25) is linearly polarized along an axis of polarization that is parallel to either the $X_1$-axis or the $Y_1$-axis. In the following "$p_\perp$" is a state of linear polarization along an axis parallel to the $X_1$-axis and represented by a dot in the figures; "$p_\parallel$" is a state of linear polarization along an axis perpendicular to the $X_1$-axis and represented by an arrow in the figures. Also in that embodiment the first beam splitter 9 is arranged between the radiation source 7 and the collimator lens 8. Further, the splitter 9 is a polarizing beam splitter so that the radiation beam entering that beam splitter is transmitted toward the power switch 203 when that beam has the polarization $p_\parallel$ and reflected toward the detection system 24 when that beam has the polarization $p_\perp$.

The power switch 203 comprises a polarization switch 70, a first mirror 71, a second mirror 71, a first quarter-wavelength 73, a second quarter-wavelength 74, a third quarter-wavelength 75 and a second polarizing beam splitter 76. The polarizing beam splitter 76 is capable of transmitting and reflecting any radiation beam entering the splitter 76 depending on the polarization of that beam: it transmits a beam that has a polarization $p_\parallel$ and reflects a beam that has a polarization $p_\parallel$. The first mirror 71 is arranged on one side of the polarizing beam splitter 76: the optical axis of that mirror is perpendicular to the optical axis 11, i.e. parallel to the $O_1Y_1$-axis. The second mirror 72 is arranged on another side of the polarizing beam splitter 76: the optical axis of that mirror is perpendicular to the optical axis 11, i.e. parallel to the $O_1Y_1$-axis. In that embodiment the mirrors 71 and 72 forms a Gaussian-type telescopic arrangement, i.e. the image focal point of the mirror 71 is the object focal point of the mirror 72. The first quarter-wavelength plate 73 is arranged between the polarizing beam splitter 76 and the mirror 71 so as to have the same optical axis as the mirror 71. The second quarter-wavelength plate 74 is arranged between the polarizing beam splitter 76 and the mirror 72 so as to have the same optical axis as the mirror 72. The third quarter-wavelength plate 75 is arranged between the polarizing beam splitter 76 and the objective lens 10 so as to have the same optical axis as the optical axis 11 of the objective lens 10. The polarization switch 70 is arranged in the optical path of the radiation beam transmitted by the first beam splitter 9 and, in that embodiment, between the collimator lens 8 and the second beam splitter 76. The polarization switch 70 is capable of changing the polarization of that radiation beam between the polarizations $P_\perp$ and $p_\parallel$. The polarization switch 70 comprises, by way of illustration only, an electrically controllable liquid crystal cell. In the embodiment shown in FIG. 9 the polarization switch 70 is arranged so that the polarization of the radiation beam going to and coming from the second polarizing beam splitter 76 is switched at the writing mode and is not changed at the reading mode.

In that embodiment decreasing and increasing the size of the radiation beam 25 at the writing and reading modes, respectively, is performed by changing the optical path of the radiation beam propagating through the power switch 203 via switching of the polarization of that beam. FIG. 10A shows certain optical components of the scanning device 1 provided with the scanning spot power switch 203 shown in FIG. 9, operating at the writing mode. FIG. 10B shows the same optical components operating at the reading mode. The paths of a rim ray of the radiation beam 25, in particular through the power switch 203, are shown in FIG. 10A (writing mode) and FIG. 10B (reading mode) by dotted lines from the radiation source 7 to the record carrier 3 and by solid lines from the record carrier 3 to the detector 24.

As shown in FIG. 10A (writing mode), the radiation beam 4 has the polarization $p_\parallel$ and therefore the polarizing beam splitter 9 transmits that beam toward the collimator lens 8. The collimated beam 17 with the polarization $p_\parallel$ enters the power switch 203 and is entering the polarization switch 70. In that embodiment and at the writing mode the polarization switch 70 changes the polarization $p_\parallel$ to the polarization $p_\perp$. Thus, the radiation beam entering the second polarizing beam splitter 76 has the polarization $p_\perp$: the splitter 76 reflects that beam toward the mirror 71 via the plate 73. The mirror 71 then reflects the beam toward the beam splitter 76, again via the plate 73, so that the beam has now the polarization $p_\parallel$. Consequently, the beam splitter 76 transmits that beam toward the second mirror 72 via the plate 74. The mirror 72 then reflects the beam toward the beam splitter 76, again via the plate 74, so that the beam has now the polarization $p_\perp$. Thus, the beam splitter reflects that beam toward the objective lens 10 via the plate 75. After reflection on the information layer 2, the beam propagates to the beam splitter 76 via the objective lens 10 and the plate 75, so that the beam has now the polarization $p_\parallel$. Therefore, the beam splitter 76 transmits toward the polarization switch 70 that beam having the polarization $p_\parallel$. Again, in that embodiment and at the writing mode the polarization switch 70 changes the polarization $p_\parallel$ to the polarization $p_\perp$. Thus, the radiation beam emerging from the polarization switch 70 has the polarization $p_\perp$ and propagates to the first polarizing beam splitter 9 via the collimator lens 8: the splitter 9 reflects that beam toward the detector 24.

As shown in FIG. 10B (reading mode), the radiation beam 4 has the polarization $p_\parallel$ and therefore the polarizing beam splitter 9 transmits that beam toward the collimator lens 8. The collimated beam 17 with the polarization $p_\parallel$ enters the power switch 203 and is entering the polarization switch 70. In that embodiment and at the reading mode the polarization switch 70 does not change the polarization. Thus, the radiation beam entering the second polarizing beam splitter 76 has the polarization $p_\parallel$: the splitter 76 transmits that beam toward the objective lens 10 via the plate 75. After reflection on the information layer 2, the beam propagates to the beam splitter 76 via the objective lens 10 and the plate 75, so that the beam has now the polarization $p_\perp$. Therefore, the beam splitter 76 reflects that beam toward the mirror 72 via the plate 72. The mirror 72 then reflects the beam toward the beam splitter 76, again via the plate 74, so that the beam has now the polarization $p_\parallel$. Consequently, the beam splitter 76 transmits that beam toward the second mirror 71 via the plate 73. The mirror 71 then reflects the beam toward the beam splitter 76, again via the plate 73, so that the beam has now the polarization $p_\perp$. Thus, the beam splitter reflects toward the polarization switch 70 that beam having the polarization $p_\perp$. Again, in that embodiment and at the reading mode the polarization switch 70 does not change the polarization. Thus, the radiation beam emerging from the polarization switch 70 has the polarization $p_\perp$ and propagates to the first polarizing beam splitter 9 via the collimator lens 8: the splitter 9 reflects that beam toward the detector 24.

The distances $h_{writing}$ and $h_{reading}$ depends on the design parameters of the second beam splitter 76, the mirrors 71 and 72, and the plates 73, 74 and 75. It has been found that the distances $h_{writing}$ and $h_{reading}$ are given, in that embodiment, by the following equation:

$$\frac{h_{writing}}{h_{reading}} = -\frac{f_1}{f_2} \quad (8)$$

where "$f_1$" and "$f_2$" are the image focal lengths of the mirrors 71 and 72, respectively.

By way of illustration only, Table III shows values of the focal lengths $f_1$ and $f_2$ at the writing and reading modes and the corresponding heights $h_{writing}$ and $h_{reading}$ according to Equations (8a) and (8b).

TABLE III

| | $f_1$ [in mm] | $f_2$ [in mm] | $h_{writing}$ [in mm] | $h_{reading}$ [in mm] |
|---|---|---|---|---|
| Writing mode | +50 | −43.75 | 1.6 | N/A |
| Reading mode | N/A | N/A | N/A | 1.4 |

Therefore, and with reference to Table I, by a proper choice of the focal lengths $f_1$ and $f_2$ it is possible to transform the collimated radiation beam 17 into the radiation beam 25 where the rim intensity of the beam 25 entering the objective lens 10 equals, at the writing mode, $I_{rim,writing}$ so that the light power P equals $P_{writing}$ and, at the reading mode, $I_{rim,reading}$ so that the light power P equals $P_{reading}$. As already mentioned with reference to Table I, the ratio $P_{writing}/P_{reading}$ approximately equals 125% in the ideal case where there is no light transmission loss in the optical scanning device 1 is provided with the power switch 203 shown in FIG. 9.

It is noted that the scanning spot power switch 203 is arranged between the collimator lens 8 and the objective lens 10, thereby forming a telescope-like arrangement having both object and image conjugates at the infinity.

It is to be appreciated that numerous variations and modifications may be employed in relation to the embodiments described above, without departing from the scope of the invention that is defined in the appended claims.

As an alternative to either the first or second embodiment of the scanning spot power switch, the entrance or exit face of the electrowetting device may be designed for serving, e.g., as a lens such as the collimator lens or as a diffractive structure.

The invention claimed is:

1. An optical scanning device for scanning an information layer by means of a radiation beam in a writing mode and a reading mode, the device comprising:
    a radiation source for emitting said radiation beam,
    an objective lens having an optical axis, for converging said radiation beam so as to form a scanning spot in the position of said information layer, and
    a scanning spot power switch arranged in the optical path of said radiation beam, for switching the light power of said scanning spot between a first light power level at the writing mode and a second, lower light power level at the reading mode,
    characterized in that said scanning spot power switch is further arranged for switching the size of the cross-section of said radiation beam between a first size at the writing mode and a second, larger size at the reading mode so as to switch the rim intensity of said radiation beam between a first rim intensity level at the writing mode and a second, higher rim intensity level at the reading mode, thereby switching the light power of said scanning spot between said first light power level at the writing mode and said second light power level at the reading mode.

2. An optical scanning device according to claim 1, further including a collimator lens arranged between said radiation source and said scanning spot power switch and wherein said scanning spot power switch forms a telescope-like arrangement having a switchable transverse magnification between the writing and reading modes so that the cross-section of said radiation beam has said first size at the writing mode and said second size at the reading mode.

3. An optical scanning device according to claim 1, wherein said scanning spot power switch includes a variable-focus liquid lens having a first meniscus and a second meniscus the shapes of which are electrically adjustable such that the cross-section of said radiation beam has said first size at the writing mode and said second size at the reading mode.

4. An optical scanning device according to claim 1, wherein said radiation beam has either a first polarization or a second, different polarization and wherein said scanning spot power switch includes:
    a polarizing beam splitter capable of transmitting and reflecting said radiation beam depending on its polarization,
    a first mirror arranged on one side of said polarizing beam splitter and a second mirror arranged on another side of said polarizing beam splitter,
    a first quarter-wavelength plate arranged between said polarizing beam splitter and said first mirror,
    a second quarter-wavelength plate arranged between said polarizing beam splitter and said second mirror,
    a third quarter-wavelength plate arranged between said polarizing beam splitter and said objective lens, a polarization switch arranged in the optical path of said radiation beam, capable of changing the polarization of said radiation beam between said first and second polarizations such that the cross-section of said radiation beam has said first size at the writing mode and said second size at the reading mode.

5. An optical scanning device according to claim 1, further including a detection system arranged for providing a focus error signal and/or a radial-tracking error signal and in that it further includes a servo circuit and an actuator responsive to said focus error signal and/or said radial-tracking error signal for controlling the positions of said scanning spot with respect to the position of said information layer and/or of a track of said information layer which is to be scanned.

6. An optical scanning device as claimed in claim 5, further including an information processing unit for error correction.

7. A scanning spot power switch suitable for an optical scanning device for scanning an optical record carrier by means of a radiation beam at a writing mode and a reading mode, the power switch being arranged for switching the light power of said scanning spot between a first light power level at the writing mode and a second, lower light power level at the reading mode characterized in that it is further arranged for switching the size of the cross-section of said radiation beam between a first size at the writing mode and a second, larger size at the reading mode so as to switch the rim intensity of said radiation beam between a first rim intensity level at the writing mode and a second, higher rim intensity level at the reading mode, thereby switching the light power of said scanning spot between said first light power level at said first mode and said second light power level at said second mode.

* * * * *